(12) United States Patent
Sakamoto

(10) Patent No.: US 11,556,049 B2
(45) Date of Patent: *Jan. 17, 2023

(54) PROJECTION-TYPE DISPLAY APPARATUS AND LENS HOLDING MECHANISM

(71) Applicant: SEIKO EPSON CORPORATION, Tokyo (JP)

(72) Inventor: Kenji Sakamoto, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/344,583

(22) Filed: Jun. 10, 2021

(65) Prior Publication Data

US 2021/0302813 A1 Sep. 30, 2021

Related U.S. Application Data

(63) Continuation of application No. 16/677,886, filed on Nov. 8, 2019, now Pat. No. 11,061,306.

(30) Foreign Application Priority Data

Nov. 12, 2018 (JP) .............................. JP2018-211982

(51) Int. Cl.
| | | |
|---|---|---|
| *G03B 21/14* | (2006.01) | |
| *G03B 21/28* | (2006.01) | |
| *G03B 21/00* | (2006.01) | |
| *G03B 33/12* | (2006.01) | |

(52) U.S. Cl.
CPC ......... *G03B 21/142* (2013.01); *G03B 21/006* (2013.01); *G03B 21/28* (2013.01); *G03B 33/12* (2013.01)

(58) Field of Classification Search
CPC .... G03B 21/006; G03B 21/008; G03B 21/28; G03B 21/142; G03B 21/145; G03B 33/08; G03B 33/10; G03B 33/12; H04N 9/31; H04N 9/315; H04N 9/3141
See application file for complete search history.

(56) References Cited

U.S. PATENT DOCUMENTS

| | | | |
|---|---|---|---|
| 6,364,491 B1 | 4/2002 | Okada et al. | |
| 8,696,133 B2 | 4/2014 | Imaoka et al. | |
| 9,335,613 B2 | 5/2016 | Sato | |
| 2005/0117127 A1 | 6/2005 | Jang | |
| 2007/0019118 A1* | 1/2007 | Nakagawa | G02B 7/008 349/5 |

(Continued)

FOREIGN PATENT DOCUMENTS

| | | |
|---|---|---|
| JP | 2001-166380 A | 6/2001 |
| JP | 2018-54939 A | 4/2018 |

(Continued)

*Primary Examiner* — Sultan Chowdhury
(74) *Attorney, Agent, or Firm* — Oliff PLC

(57) ABSTRACT

A projector includes a main body and a projection lens. The main body includes a light source, liquid crystal panels that modulate light outputted from the light source, and a lens holder to and from which the projection lens is attachable and detachable. The projection lens projects the light modulated, and the lens holder includes a first lens holding mechanism and a second lens holding mechanism that hold the projection lens.

7 Claims, 14 Drawing Sheets

(56) References Cited

U.S. PATENT DOCUMENTS

| | | | |
|---|---|---|---|
| 2007/0058373 A1* | 3/2007 | Yoshimura | F21V 29/67 362/294 |
| 2009/0116127 A1* | 5/2009 | Liang | G03B 37/04 359/749 |
| 2011/0310364 A1* | 12/2011 | Wakabayashi | G03B 21/142 353/121 |
| 2013/0107360 A1* | 5/2013 | Kurtz | G02B 5/3083 359/708 |
| 2018/0088449 A1 | 3/2018 | Hatano | |
| 2018/0217477 A1 | 8/2018 | Kurota et al. | |
| 2018/0217489 A1 | 8/2018 | Kuroda | |
| 2018/0314138 A1 | 11/2018 | Inui | |

FOREIGN PATENT DOCUMENTS

| | | |
|---|---|---|
| JP | 2018-116213 A | 7/2018 |
| JP | 2018-124311 A | 8/2018 |

\* cited by examiner

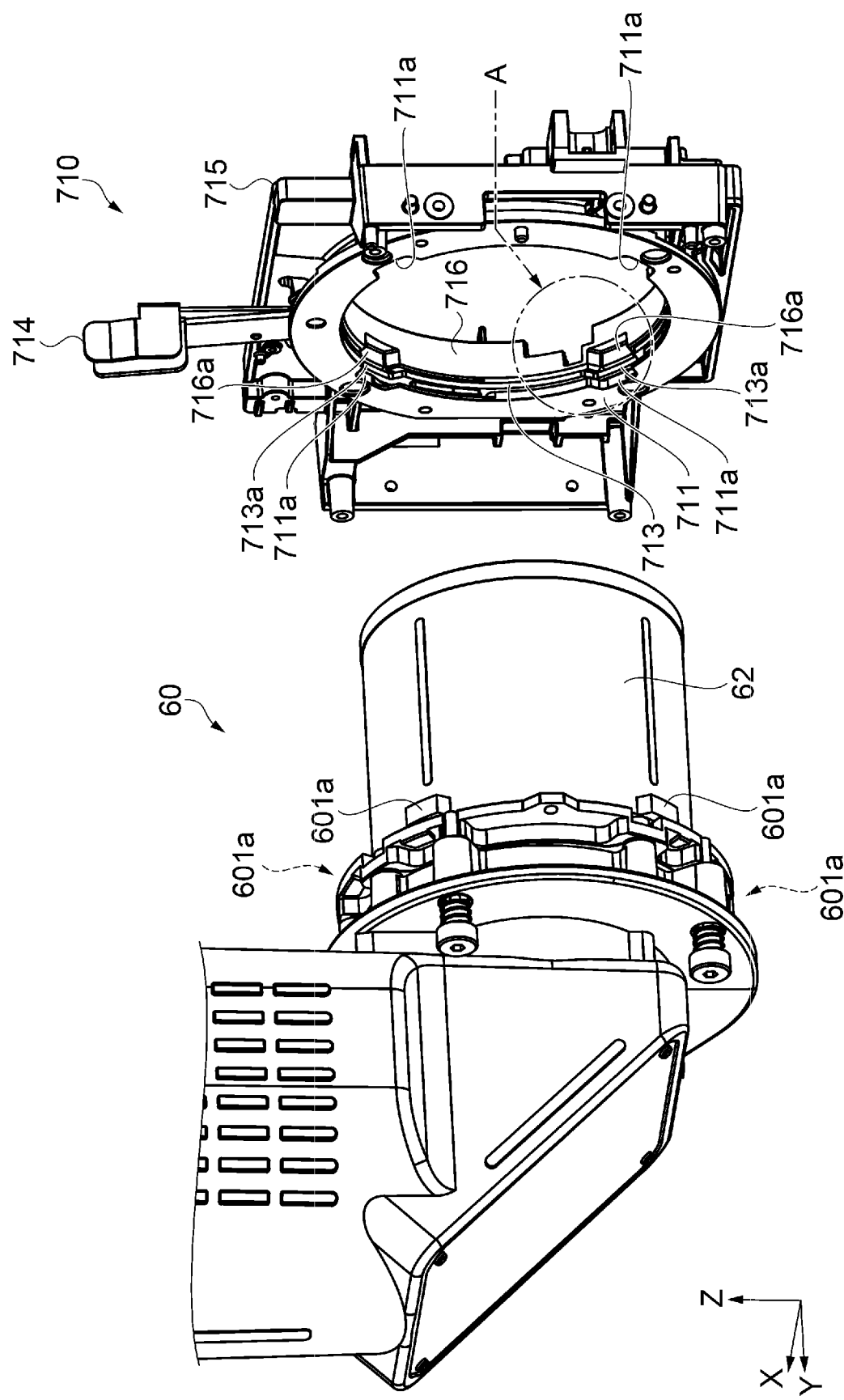

PROJECTION-TYPE DISPLAY APPARATUS AND LENS HOLDING MECHANISM

This application is a continuation of U.S. application Ser. No. 16/677,886, filed Nov. 8, 2019, the contents of which are incorporation hereby by reference.

The present application is based on, and claims priority from JP Application Serial Number 2018-211982, filed Nov. 12, 2018, the disclosure of which is hereby incorporated by reference herein in its entirety.

BACKGROUND

1. Technical Field

The present disclosure relates to a projection-type display apparatus and a lens holding mechanism.

2. Related Art

There is a known projection-type display apparatus including a holding mechanism to and from which a projection lens is attachable and detachable. For example, JP-A-2001-166380 discloses a liquid crystal projector including a lens holder having a bayonet structure as the holding mechanism.

In the liquid crystal projector described in JP-A-2001-166380, however, an increase in the weight of the projection lens causes a problem of making it difficult for the lens holder to handle the resultant load. In detail, there is a recent tendency for the weight of a projection lens to increase due, for example, to a projection lens having a large size for improving the display quality and a bending-type projection lens that inverts the projection direction. When impact or the like acts on the liquid crystal projector on which the projection lens described above is mounted, the load resulting from the impact or the like could exceed the load acceptable by the lens holder, resulting in breakage of the lens holder. That is, a projection-type display apparatus having a holding mechanism that reduces the load on the lens holder in correspondence with an increase in the weight of the projection lens.

SUMMARY

A projection-type display apparatus according to an aspect of the present disclosure includes a main body and a projection lens. The main body includes a light source, a light modulator that modulates light outputted from the light source, and a lens holder to and from which the projection lens is attachable and detachable. The projection lens projects the light modulated by the light modulator. The lens holder includes a first lens holding mechanism that holds the projection lens and a second lens holding mechanism different from the first lens holding mechanism.

In the projection-type display apparatus described above, the second lens holding mechanism may hold the projection lens independently of the first lens holding mechanism.

In the projection-type display apparatus described above, the second lens holding mechanism may include a holding section capable of sandwiching the projection lens, a support section that supports the holding section, and a switching section that moves the support section to switch a state in which the holding section sandwiches the projection lens and a state in which the projection lens sandwiched by the holding section is released from one to another.

In the projection-type display apparatus described above, the switching section may be a dial, and the dial may be caused to pivot to move the support section so that the state in which the holding section sandwiches the projection lens and the state in which the sandwiched projection lens is released are switched from one to another.

In the projection-type display apparatus described above, the holding section may have a plurality of protrusions, and the projection lens may have a plurality of recesses which are located in correspondence with the plurality of protrusions and into which the plurality of protrusions fit.

In the projection-type display apparatus described above, the first lens holding mechanism may include a pivotal section capable of pivoting along an outer circumference of the projection lens and a lever section that causes the pivotal section to pivot, and the projection lens may include an engagement counterpart that engages with the pivotal section when the pivotal section is caused to pivot.

The projection-type display apparatus described above may further include a position adjustment mechanism that moves a position of the lens holder relative to the light modulator.

A lens holding mechanism according to another aspect of the present disclosure is a lens holding mechanism that holds a projection lens, the lens holding mechanism including a first lens holding mechanism and a second lens holding mechanism different from the first lens holding mechanism.

BRIEF DESCRIPTION OF THE DRAWINGS

FIG. 6 is a diagrammatic view showing the state in which a first lens holding mechanism is separate from the projection lens.

DESCRIPTION OF EXEMPLARY EMBODIMENTS

Figure 1:
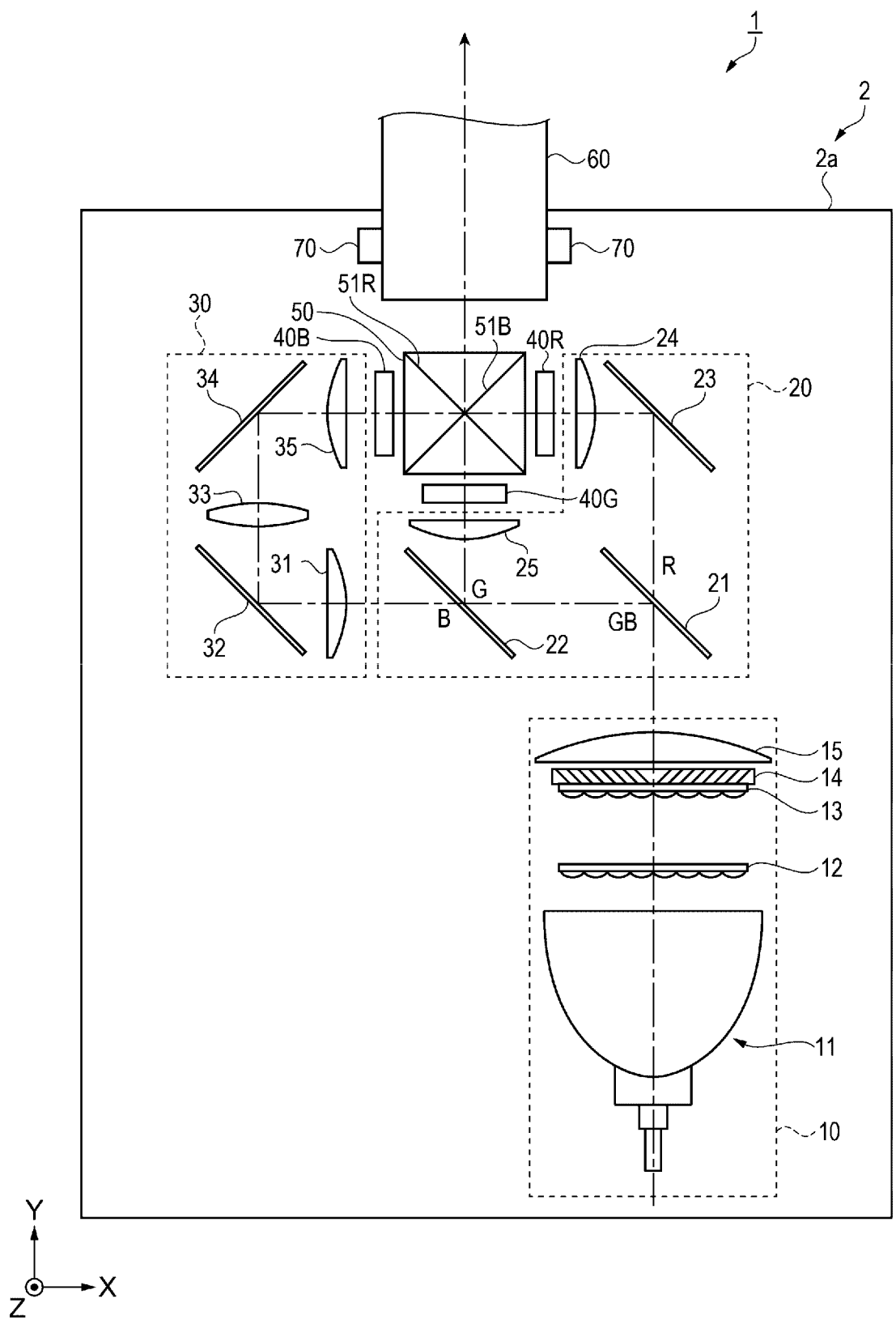
FIG. 1 is a schematic view showing the configuration of a projector according to a first embodiment.

Embodiments of the present disclosure will be described below with reference to the drawings. The embodiments described below are each an example of the present disclosure. The present disclosure is not limited to the following embodiments and also encompasses a variety of variations implemented to the extent that the variations do not change the substance of the present disclosure. Each member in the following drawings is so drawn at a scale different from an actual scale as to be large enough to be recognizable in the drawings.

In the drawings below, axes XYZ, which are coordinate axes perpendicular to one another, are drawn as required. In this case, the axes XYZ in each of the drawings are so configured that the plane XY coincides with a substantially horizontal plane, and the direction that the arrow of the axis Z indicates, that is, the positive side of the direction Z is substantially opposite the direction in which the gravity acts. The positive side of the direction Z is also referred to as an "upper side," and the negative side of the direction Z is also referred to as a "lower side."

First Embodiment

The present embodiment will be described with reference to a case where the projection-type display apparatus is a projector including three liquid crystal panels as light modulators.

1.1. Projector

The configuration of the projector according to the present embodiment will be described with reference to FIG. 1. FIG. 1 is a schematic view showing the configuration of the projector according to the first embodiment.

The projector 1 according to the present embodiment includes a main body 2 and a projection lens 60, as shown in FIG. 1. The main body 2 is accommodated in an exterior enclosure 2a. The exterior enclosure 2a is made, for example, of a resin material and is the combination of a plurality of members. The projection lens 60 is so disposed as to protrude out of the exterior enclosure 2a. The projection lens 60 is mounted on the main body 2 via a lens holder 70.

The main body 2 includes a light source 10, a color separation system 20, and a relay system 30, which serve as an illumination system, three liquid crystal panels 40R, 40G, and 40B, which serve as the light modulators, a cross dichroic prism 50, which serves as a light combining system, and the lens holder 70. The projection lens 60 is attachable to and detachable from the lens holder 70. The liquid crystal panels 40R, 40G, and 40B modulate light outputted from the light source 10. The projection lens 60 projects the light modulated by the liquid crystal panels 40R, 40G, and 40B.

The light source 10 includes a light source 11, a first lens array 12, a second lens array 13, a polarization converter 14, and a superimposing lens 15. The first lens array 12 and the second lens array 14 each include lenslets arranged in a matrix.

In the projector 1, a discharge-type light source is employed as the light source 11, but the form of the light source 11 is not limited thereto. A light emitting diode, a laser, or any other solid-state light source may be employed as the light source 11.

A light flux outputted from the light source 11 is divided by the first lens array 12 into a plurality of minute sub-light fluxes. The sub-light fluxes are superimposed on one another by the second lens array 13 and the superimposing lens 15 on a light incident surface of each of the three liquid crystal panels 40R, 40G, and 40B, which are each an illumination target. That is, the first lens array 12, the second lens array 13, and the superimposing lens 15 form an optical integration/illumination system that illuminates the liquid crystal panels 40R, 40G, and 40B in a substantially uniform manner with the light flux outputted from the light source 11.

The polarization converter 14 converts the non-polarized light outputted from the light source 11 into polarized light usable by the three liquid crystal panels 40R, 40G, and 40B.

The color separation system 20 includes a first dichroic mirror 21, a second dichroic mirror 22, a reflection mirror 23, and field lenses 24 and 25. The color separation system 20 separates the light outputted from the light source 10 into three color light fluxes that belong to different wavelength regions. The three color light fluxes are substantially red light, substantially green light, and substantially blue light. In the following description, the substantially red light described above is also called R light, the substantially green light described above is also called G light, and the substantially blue light described above is also called B light. The field lens 24 is disposed on the light incident side of the liquid crystal panel 40R. The field lens 25 is disposed on the light incident side of the liquid crystal panel 40G.

The first dichroic mirror 21 transmits the R light and reflects the G light and the B light. The R light having passed through the first dichroic mirror 21 is reflected off the reflection mirror 23, passes through the field lens 24, and illuminates the liquid crystal panel 40R for R light.

The field lens 24 collects the light reflected off the reflection mirror 23, and the liquid crystal panel 40R is illuminated with the collected light. The field lens 25 also collects the light reflected off the second dichroic mirror 22, as does the field lens 24, and the liquid crystal panel 40G is illuminated with the collected light. In this process, the light with which each of the liquid crystal panels 40R and 40G is illuminated is so set as to be a substantially parallelized light flux.

The G light reflected off the first dichroic mirror 21 is reflected off the second dichroic mirror 22, then passes through the field lens 25, and illuminates the liquid crystal panel 40G for G light.

The first dichroic mirror 21 and the second dichroic mirror 22 are produced by forming a dielectric multilayer film formed of multiple layers each corresponding to a function on a transparent glass plate.

The relay system 30 includes a light-incident-side lens 31, a first reflection mirror 32, a relay lens 33, a second reflection mirror 34, and a light-exiting-side lens 35 as a field lens. The B light, which travels along an optical path longer than those along which the R light and the G light travel, is likely to be a wide light flux. The relay lens 33 is therefore used to suppress the expansion of the light flux. The B light having exited out of the color separation system 20 is reflected off the first reflection mirror 32 and caused by the light-incident-side lens 31 to converge in the vicinity of the relay lens 33. The B light then diverges toward the second reflection mirror 34 and the light-exiting-side lens 35.

The light-exiting-side lens 35 has the same function as that of the field lenses 24 and 25 described above, and the liquid crystal panel 40B is illuminated with the light having passed through the light-exiting-side lens 35. The light that illuminates the liquid crystal panel 40B is so set as to be a substantially parallelized light flux.

The liquid crystal panels 40R, 40G, and 40B for the color light fluxes convert the color light fluxes incident via the light incident surfaces thereof into light fluxes having intensities according to corresponding image signals and transmit and output the converted light fluxes. The liquid crystal panels 40R, 40G, and 40B are each a transmissive liquid crystal panel.

The liquid crystal panels 40R, 40G, and 40B as the light modulators are each not limited to a transmissive liquid crystal panel. Reflective light modulators, such as reflective liquid crystal panels, may be employed as the light modulators. The light modulators may instead be each a digital microdevice or any other similar device that controls the direction in which the light incident thereon exits for each micromirror that serves as a pixel to modulate the light outputted from the light source 11. Further, the configuration in which light modulators are provided for a plurality of color light fluxes is not necessarily employed, and a configuration in which one light modulator modulates the plurality of light fluxes in a time division manner may instead be employed.

The cross dichroic prism 50 combines the color converted light fluxes outputted from the liquid crystal panels 40R, 40G, and 40B with one another. The cross dichroic prism 50 has an R-light-reflecting dichroic surface 51R, which reflects the R light and a B-light-reflecting dichroic surface 51B, which reflects the B light. A dielectric multilayer film that reflects the R light is disposed on the R-light-reflecting dichroic surface 51R. A dielectric multilayer film that reflects the B light is disposed on the B-light-reflecting dichroic surface 51B. The R-light-reflecting dichroic surface 51R and the B-light-reflecting dichroic surface 51B are hereinafter also simply referred to as reflecting dichroic surfaces 51R and 51B.

The dielectric multilayer film that reflects the R light and the dielectric multilayer film that reflects the B light are so disposed as to forma substantially X-letter shape in the plan view along the direction Z. The reflecting dichroic surfaces 51R and 51B combine the three converted R light, G light, and B light with one another to produce combined light that displays a color image. The combined light produced by the cross dichroic prism 50 exits toward the projection lens 60.

The projection lens 60 is mounted on the main body 2 via the lens holder 70. The lens holder 70 is attached to a structural member that is not shown but is part of the main body 2. Further, the above-mentioned components provided in the main body 2 are similarly attached to the structural member described above. Therefore, when the projection lens 60 is held by the lens holder 70 and mounted on the main body 2, the main body 2 and the projection lens 60 are positioned with respect to each other. The positional relationship between the main body 2 and the projection lens 60 may be adjustable via a position adjustment mechanism. The lens holder 70 will be described later in detail.

The combined light having exited out of the main body 2 is projected as image light via the projection lens 60 on a projection target that is not shown, such as a screen.

Figure 2:
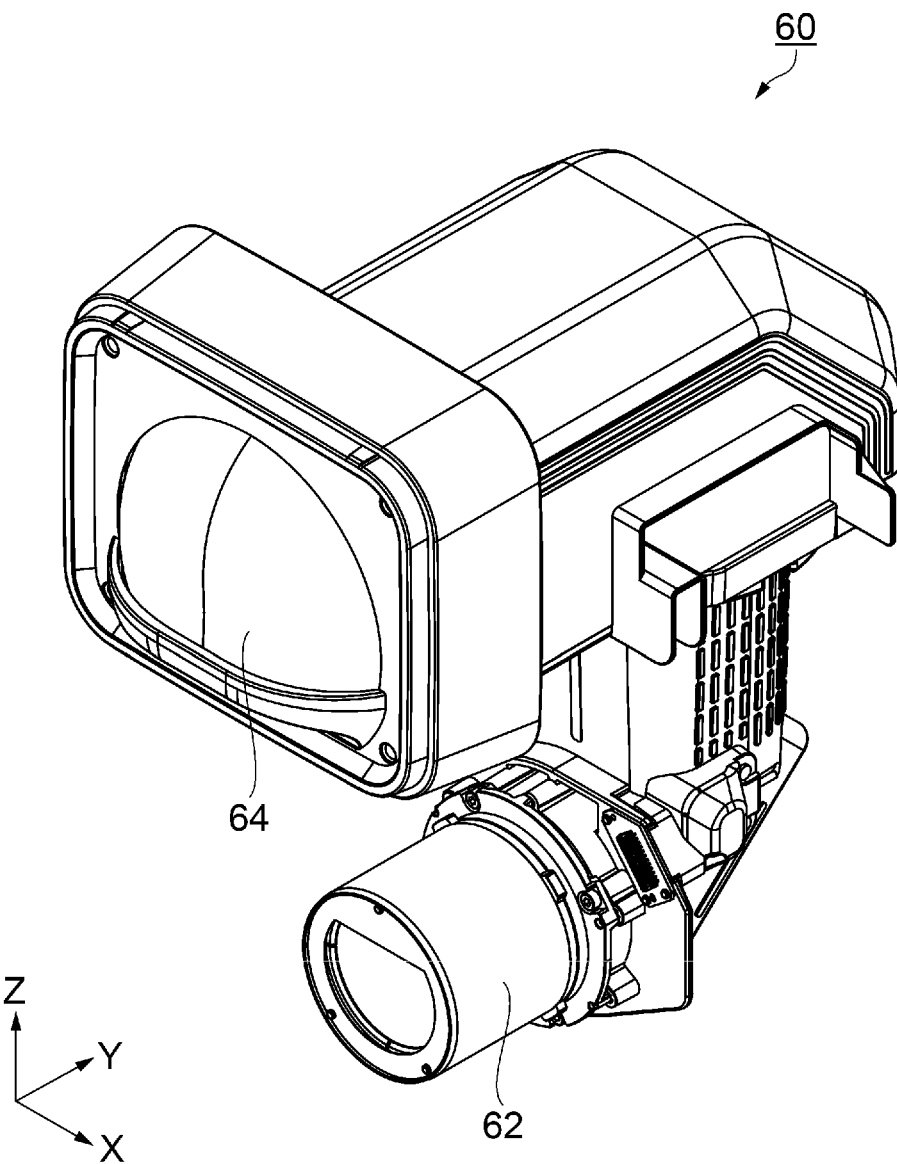
FIG. 2 is a perspective view showing the exterior appearance of a projection lens.
Figure 3:
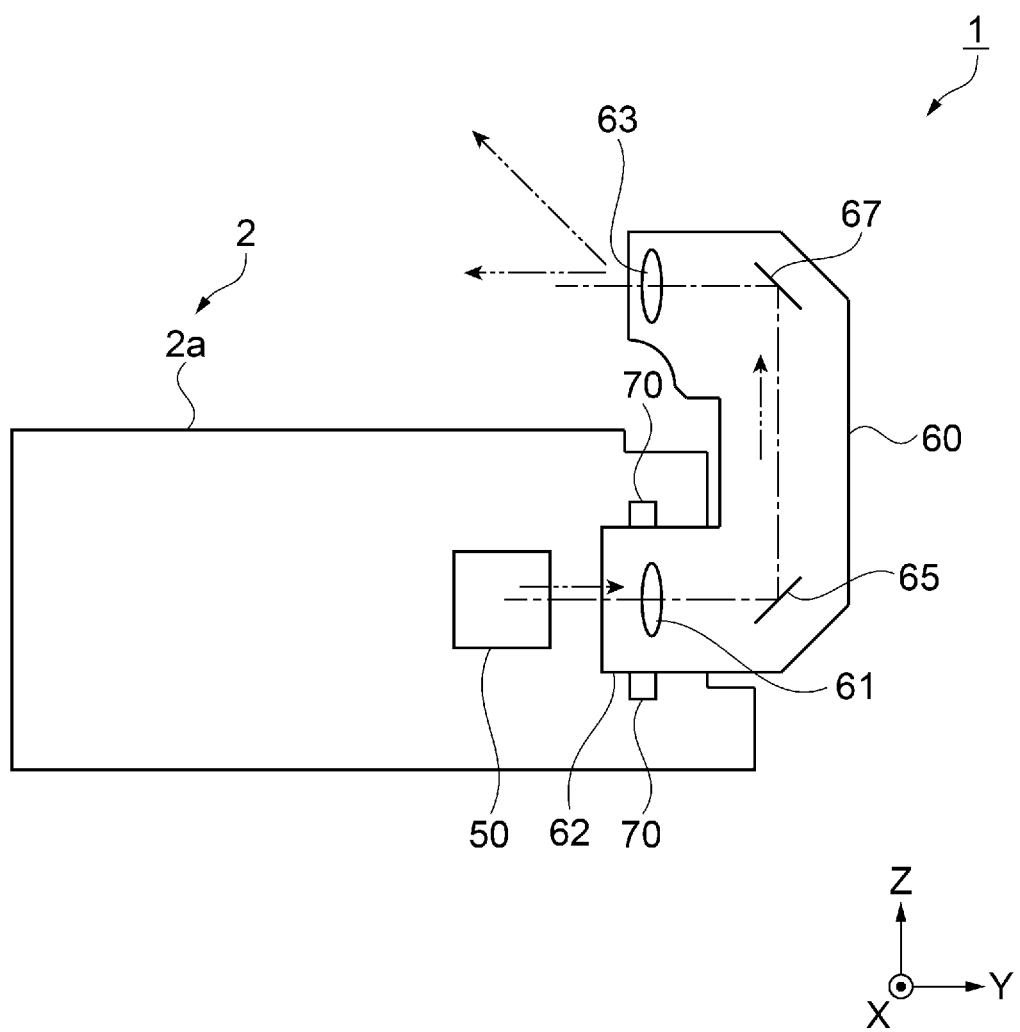
FIG. 3 is a side view diagrammatically showing the configuration of the projection lens.

The configuration of the projection lens will next be described with reference to FIGS. 2 and 3. FIG. 2 is a perspective view showing the exterior appearance of the projection lens. FIG. 3 is a side view diagrammatically showing the configuration of the projection lens. In FIG. 3, the components provided in the main body 2 excluding the exterior enclosure 2a, the cross dichroic prism 50, and the lens holder 70 are omitted.

The projection lens 60 is a bending-type projection lens and includes an optical system bent in the form of a substantially U-letter shape in the plan view along the direction X, as shown in FIG. 2. A cylindrical section 62 is provided at one end of the optical system described above in the projection lens 60. When the projection lens 60 is mounted on the main body 2, the cylindrical section 62 is inserted into the main body 2.

A lens cover 64, which covers a second lens that will be described later, is provided at the other end of the optical system described above in the projection lens 60. The lens cover 64 is openable and closable, and FIG. 2 shows the state in which the lens cover 64 is closed. The lens cover 64 opens and allows the image light to exit when the projection lens 60 is used, and the lens cover 64 closes to protect the second lens when the projection lens 60 is not used. The lens cover 64 may instead be so configured as to be attachable to and detachable from the projection lens 60.

The projection lens 60 deflects the combined light having exited out of the cross dichroic prism 50 toward the positive side of the direction Y in a two-stage sequential manner, as shown in FIG. 3. The combined light is therefore reversed toward the negative side of the direction Y out of the projector 1 and enlarged and displayed as a displayed image on the projection target that is not shown, such as a screen.

In detail, the projection lens 60 includes a first lens 61, a second lens 63, a first reflection mirror 65, a second reflection mirror 67, and other components. FIG. 3 shows only the first lens 61 closest to the demagnifying side and the second lens 63 closest to the magnifying side, and the other lenses are omitted. The thus configured projection lens 60 has a complicated configuration as compared with a non-bending-type projection lens, so that the weight of the projection lens 60 is likely to increase.

Although will be described later in detail, the projection lens 60 is mounted on the main body 2 with the cylindrical section 62 of the projection lens 60 inserted into the lens holder 70. The combined light having exited out of the cross dichroic prism 50 in the main body 2 toward the positive side of the direction Y is incident on an end surface of the cylindrical section 62 that is the end surface facing the negative side of the direction Y.

The combined light having entered the projection lens 60 travels via the first lens 61 and reaches the first reflection mirror 65. The combined light described above is then reflected off the first reflection mirror 65, so that the path of the combined light toward the positive side of the direction Z is bent, and the combined light reaches the second reflection mirror 67. The combined light described above is then reflected off the second reflection mirror 67, so that the path of the combined light toward the negative side of the direction Y is bent, and the combined light is incident on the second lens 63.

The second lens 63 enlarges the light flux incident thereon from the positive side of the direction Y and causes the enlarged light flux to exit toward the negative side of the direction Y. The combined light incident on the second lens 63 is then enlarged and projected as the image light in tilted projection toward not only the negative side of the direction Y but the side above the projector 1.

The projection lens 60 can shorten the focal length of the projector 1, unlike a non-bending-type projection lens. Using the bending-type projection lens 60 therefore allows projection from a position close to the projection target. It is noted that the bending-type projection lens 60 does not necessarily have the configuration describe above as long as the projection lens 60 can bend the optical path of the combined light having exited out of the main body 2 and output the combined light along the bent optical path. Further, the projection lens mounted on the main body 2 is not limited to a bending type, and the type of the projection lens can be selected as appropriate in accordance with the application of the projector 1.

1.2. Lens Holder

Figure 4A:
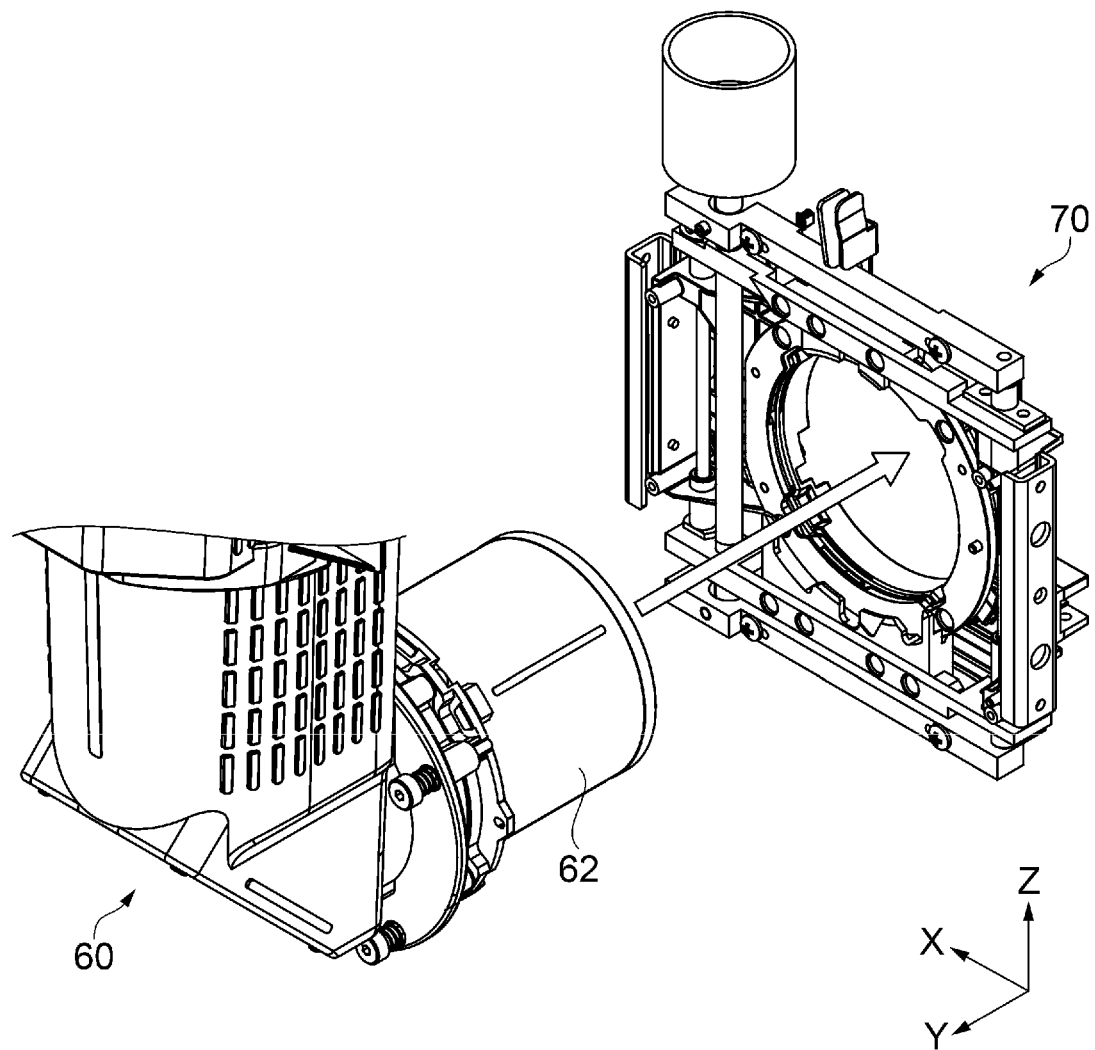
FIG. 4A is a diagrammatic view showing the state in which a lens holder and the projection lens are separate from each other.
Figure 4B:
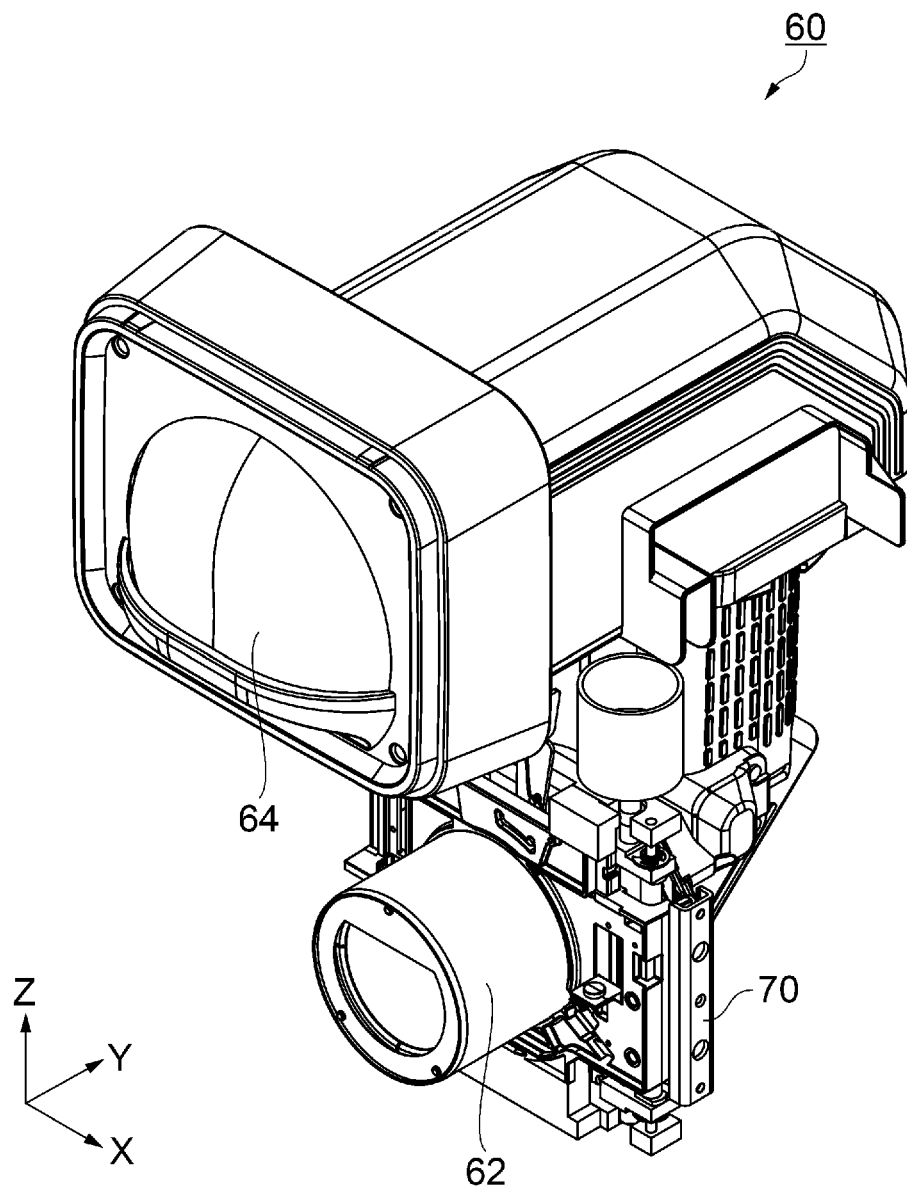
FIG. 4B is a diagrammatic view showing the state in which the lens holder holds the projection lens.
Figure 5:
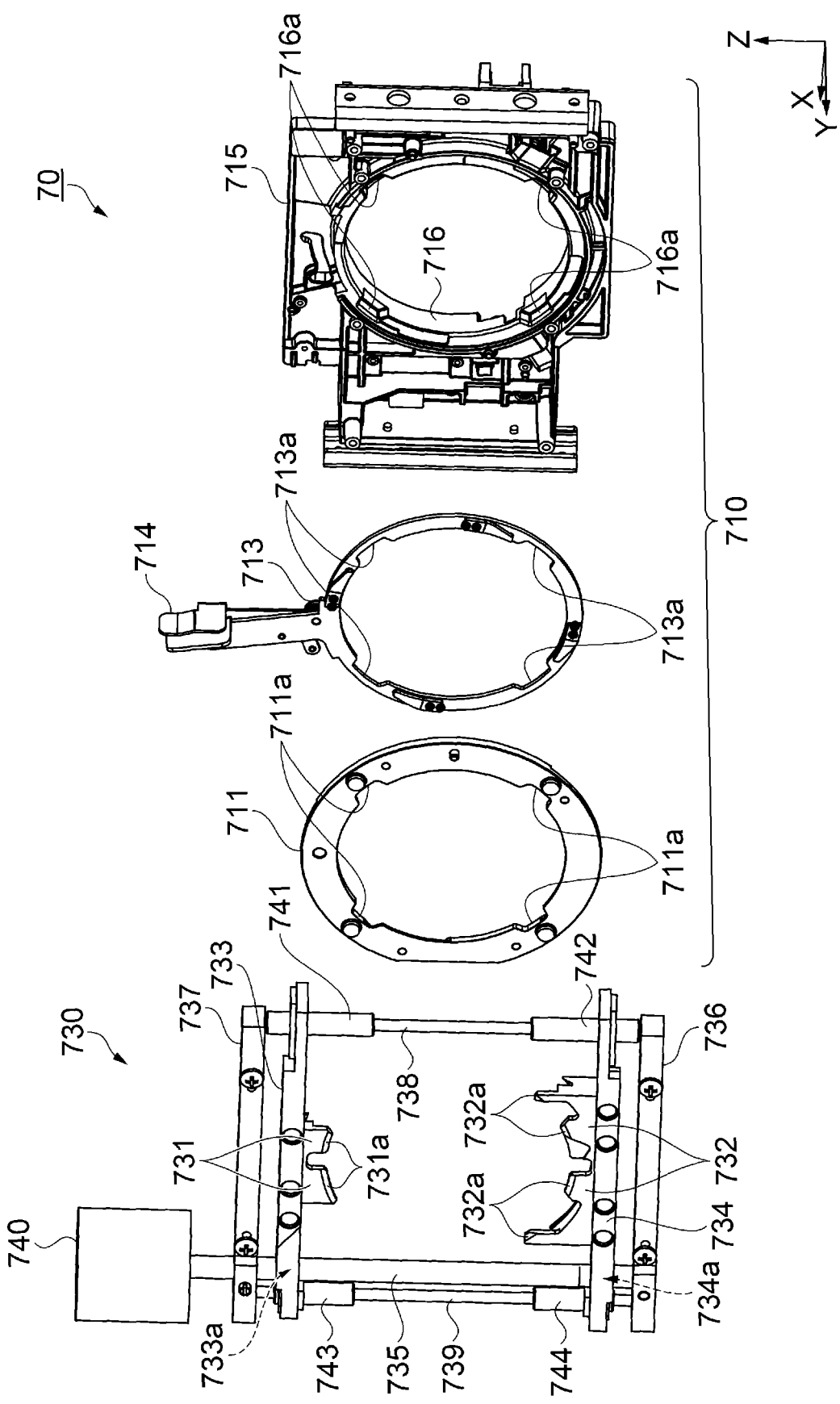
FIG. 5 is an exploded view showing the configuration of the lens holder.

The configuration of the lens holder 70 in the present embodiment and the state in which the projection lens 60 is held will be described with reference to FIGS. 4A, 4B, and 5. FIG. 4A is a diagrammatic view showing the state in which the lens holder and the projection lens are separate from each other. FIG. 4B is a diagrammatic view showing the state in which the lens holder holds the projection lens. FIG. 5 is an exploded view showing the configuration of the lens holder. In FIG. 4A, part of the projection lens 60 is omitted. In FIGS. 4A and 4B, the components of the main body 2 excluding the lens holder 70 are omitted. Further, FIG. 5 shows the lens holder with a first lens holding mechanism exploded.

The lens holder 70 is a substantially window-frame-shaped member and is disposed in parallel to the plane XZ, as shown in FIG. 4A. The cylindrical section 62 of the projection lens 60 is inserted into the interior of the substantially window-frame-shaped lens holder 70 toward the negative side of the direction Y, as indicated by the arrow. Although not shown, an opening through which the cylindrical section 62 is inserted is provided in the exterior enclosure 2a of the main body 2 in a position corresponding to the lens holder 70.

The cylindrical section 62 is inserted through the inner opening of the lens holder 70, as shown in FIG. 4B. In this process, the projection lens 60 is held by the lens holder 70 via first and second lens holding mechanisms that will be described later. The projection lens 60 is thus mounted on the main body 2.

The lens holder 70 includes a first lens holding mechanism 710 and a second lens holding mechanism 730, which hold the projection lens 60, as shown in FIG. 5. The second lens holding mechanism 730 is a lens holding mechanism different from the first lens holding mechanism 710 and holds the projection lens 60 independently of the first lens holding mechanism 710.

The first lens holding mechanism 710 and the second lens holding mechanism 730 are disposed in the presented order side by side in the direction toward the positive side of the direction Y. In other words, the first lens holding mechanism 710 is located on the side closer to the cross dichroic prism 50 shown in FIG. 1 in the direction Y than the second lens holding mechanism 730. The arrangement of the first lens holding mechanism 710 and the second lens holding mechanism 730 is not limited to the arrangement described above, and the second lens holding mechanism 730 may instead be located on the side closer to the cross dichroic prism 50 than the first lens holding mechanism 710.

The first lens holding mechanism 710 includes a ring section 711, a pivotal section 713, and a base section 715. The base section 715, the pivotal section 713, and the ring section 711 are disposed in the presented order in the direction toward the positive side of the direction Y. The first lens holding mechanism 710 is a lens holding mechanism employing what is called a spigot method.

The ring section 711 is a substantially ring-shaped member and has an opening having an inner diameter substantially equal to the outer diameter of the cylindrical section 62 of the projection lens 60. The cylindrical section 62 is therefore insertable through the opening of the ring section 711. The inner edge of the opening of the ring section 711 is provided with four cutouts 711a. Along the circumference of the opening of the ring section 711, two of the cutouts 711a face each other, and the other two face each other. The ring section 711 is fixed to the base section 715, for example, with screws.

The pivotal section 713 is pivotable along the outer circumference of the cylindrical section 62 of the projection lens 60. The pivotal section 713 includes a lever section 714 and is so shaped that the lever section 714 is added to a substantially-ring-shaped member. The lever section 714 causes the pivotal section 713 to pivot. The substantially-ring-shaped member described above has an opening having an inner diameter substantially equal to the outer diameter of the cylindrical section 62, whereby the cylindrical section 62 of the projection lens 60 is insertable through the opening. The inner edge of the opening of the substantially-ring-shaped member described above is provided with four cutouts 713a. Along the circumference of the opening of the pivotal section 713, two of the cutouts 713a face each other, and the other two face each other.

The pivotal section 713 is sandwiched between the ring section 711 and the base section 715 but is not fixed thereto. Operating the lever section 714 therefore allows the pivotal section 713 to pivot around an imaginary center of the inner circumferential circle of the ring section 711. The lever section 714 is so disposed as to protrude out of the exterior enclosure 2a of the main body 2 shown in FIG. 1 toward the exterior thereof. The lever section 714 can therefore be operated by an operator outside the exterior enclosure 2a.

The base section 715 is a frame body, and a cylindrical member 716 is provided inside the frame body. The cylindrical member 716 is a substantially cylindrical member, the inner diameter of which is substantially equal to the outer diameter of the cylindrical section 62 of the projection lens 60. The cylindrical section 62 is therefore insertable into the cylindrical member 716. The inner surface of the cylindrical member 716 is provided with four cutouts 716a. Along the circumference of the inner surface of the cylindrical member 716, two of the cutouts 716a face each other, and the other two face each other. The base section 715 supports the ring section 711 and is fixed to a structural body that is not shown, such as a frame, but is part of the main body 2. The cutouts 711a, 713a, and 716a have substantially the same shapes when viewed from the positive side of the direction Y.

How the first lens holding mechanism 710 holds the projection lens 60 will be described later. The first lens holding mechanism 710 does not necessarily employ the spigot method described above and may employ any other known method.

The second lens holding mechanism 730 includes holding sections 731 and 732, an upper support section 733 and a lower support section 734 as a pair of support sections, an upper frame section 737 and a lower frame section 736, guide sections 738 and 739, a shaft section 735, and a dial 740 as a switching section.

The upper frame section 737 and the lower frame section 736 are each a substantially quadrangular columnar member, with the upper frame section 737 disposed on the upper side and the lower frame section 736 disposed on the lower side. The upper frame section 737 and the lower frame section 736 are so configured that the height direction of the substantially quadrangular columnar members coincides with the direction X and are so paired with each other as to face each other in the direction Z.

The guide sections 738 and 739 are each a circular columnar member. The guide section 738 is connected to right end portions of the upper frame section 737 and the lower frame section 736 when viewed from the positive side of the direction Y. The guide section 739 is connected to left end portions of the upper frame section 737 and the lower frame section 736 when viewed from the positive side of the direction Y. The guide sections 738 and 739 are so configured that the height direction of the circular columnar members coincides with the direction Z and are so paired with each other as to face each other in the direction X.

The upper frame section 737 and the lower frame section 736 and the guide sections 738 and 739 form a substantially quadrangular frame body in the plan view along the direction Y. The frame body is a structural body in the second lens holding mechanism 730. The frame body is fixed to a structural body that is not shown, such as a frame, but is part of the main body 2.

The upper support section 733 and the lower support section 734 are each a substantially quadrangular columnar member, with the upper support section 733 disposed on the upper side and the lower support section 734 disposed on the lower side. That is, the upper support section 733 and the lower support section 734 extend in the direction X and are so paired with each other as to face each other in the direction Z. The upper support section 733 is located below the upper frame section 737, and the lower support section 734 is located above the lower frame section 736.

A guided section 741 is provided at the right end of the upper support section 733, and a guided section 743 is provided at the left end of the upper support section 733 when viewed from the positive side of the direction Y. A guided section 742 is provided at the right end of the lower support section 734, and a guided section 744 is provided at the left end of the lower support section 734 when viewed from the positive side of the direction Y. The guided sections 741, 742, 743, and 744 are each a cylindrical member, and the inner diameter of the guided sections 741, 742, 743, and 744 is substantially equal to the outer diameter of the guide sections 738 and 739. The guided sections 741, 742, 743, and 744 are so disposed that the height direction of the cylindrical members coincides with the direction Z.

The guide section 738 is inserted into the guided sections 741 and 742, and the guide section 739 is inserted into the guided sections 743 and 744. The guided sections 741 and 743 are therefore guided by the guide sections 738 and 739, whereby the upper support section 733 is movable toward the positive and negative sides of the direction Z. Similarly, the guided sections 742 and 744 are guided by the guide sections 738 and 739, whereby the lower support section 734 is movable toward the positive and negative sides of the direction Z.

The upper support section 733 and the lower support section 734 include the pair of holding sections 731 and 732, which sandwich the projection lens 60. In detail, the upper support section 733 supports the holding section 731 so disposed as to face downward, and the lower support section 734 supports the holding section 732 so disposed as to face upward. The holding section 731 includes a plurality of protrusions 731a, which protrude downward. Each set of two of the protrusions 731a forms a pair. The holding section 732 includes a plurality of protrusions 732a, which protrude upward. Each set of two of the protrusions 732a forms a pair.

To hold the projection lens 60, the protrusions 731a and 732a protrude toward the projection lens 60 and engage with a plurality of recesses, which will be described later, of the projection lens 60.

The dial 740, which is caused to pivot, moves the upper support section 733 and the lower support section 734 to switch the state in which the holding sections 731 and 732 sandwich the projection lens 60 and the state in which the projection lens 60 sandwiched between the holding sections 731 and 732 is released from one to the other.

The dial 740 is a cylindrical knob and is disposed on the upper left of the above-mentioned frame body formed of the upper frame section 737, the lower frame section 736, and the guide sections 738 and 739 when viewed from the positive side of the direction Y. The dial 740 is provided with a shaft section 735, which extends downward from the dial 740. The shaft section 735 is disposed substantially in parallel to the direction Z oriented toward both the positive and negative sides thereof, and the center axis of the dial 740 substantially coincides with the center axis of the shaft section 735. The dial 740 is therefore configured to be pivotable around the shaft section 735 as the axis of rotation. The shaft section 735 is provided with a male thread. The male thread is so formed that the threaded direction on one side of the lengthwise middle point of the shaft section 735 differs from that on other side. Specifically, the male thread on the portion above the middle point described above is a left-handed thread, and the male thread on the portion below the middle point described above is a right-handed thread.

The shaft section 735 is so disposed as to pass through the upper frame section 737, the lower frame section 736, the upper support section 733, and the lower support section 734 and is juxtaposed with the guide section 739 on the right thereof when viewed from the positive side of the direction Y. The shaft section 735 is not fixed to the upper frame section 737 or the lower frame section 736.

A female thread 733a is provided on the inner surface of a through hole, through which the shaft section 735 passes, in the upper support section 733. The female thread 733a is a left-handed thread that is engageable with the male left-handed thread on the shaft section 735. A female thread 734a is provided on the inner surface of a through hole, through which the shaft section 735 passes, in the lower support section 734. The female thread 734a is a right-handed thread engageable with the male right-handed thread on the shaft section 735. The configuration described above causes the upper support section 733 and the lower support section 734 to move along the direction Z as a first direction when the dial 740 is caused to pivot. That is, the distance in the direction Z between the upper support section 733 and the lower support section 734, which form a pair, can be so changed as to increase or decrease.

In detail, when the dial 740 is caused to pivot clockwise when viewed from above, the shaft section 735 also rotates in the same direction. In this case, the upper support section 733, which has the female thread 733a, moves downward, and the lower support section 734, which has the female thread 734a, moves upward. In this process, the upper support section 733 and the lower support section 734 are guided by the guide sections 738 and 739. The distance in the direction Z between the upper support section 733 and the lower support section 734 decreases with the positional relationship between the two support sections, which extend along the direction X in parallel to each other, maintained. That is, the gap between the holding sections 731 and 732 can be narrowed by causing the dial 740 to pivot clockwise when viewed from above. The projection lens 60 is thus held.

On the other hand, when the dial 740 is caused to pivot counterclockwise when viewed from above, the shaft section 735 also rotates in the same direction. In this case, the distance in the direction Z between the upper support section 733 and the lower support section 734 increases with the positional relationship between the two support sections, which extend along the direction X in parallel to each other, maintained. That is, the gap between the holding sections 731 and 732 can be widened by causing the dial 740 to pivot counterclockwise when viewed from above. The state in which the projection lens 60 is held is thus released. How the second lens holding mechanism 730 holds the projection lens 60 will be described later in detail.

The dial 740 is so disposed as to be exposed out of the exterior enclosure 2a of the main body 2 shown in FIG. 1. The dial 740 can therefore be operated by the operator outside the exterior enclosure 2a. In the present embodiment, the dial 740 is presented as the switching section by way of example, and the switching section is not limited to a specific component and may be any component that can move the upper support section 733 and the lower support section 734. Other employable examples of the switching section may include a lever-shaped component or a slidable component.

The second lens holding mechanism 730 does not necessarily have the configuration described above, and it is more preferable to employ the configuration described above, which allows simple attachment and detachment of the projection lens 60.

1.3. How First Lens Holding Mechanism Holds Projection Lens

Figure 7A:
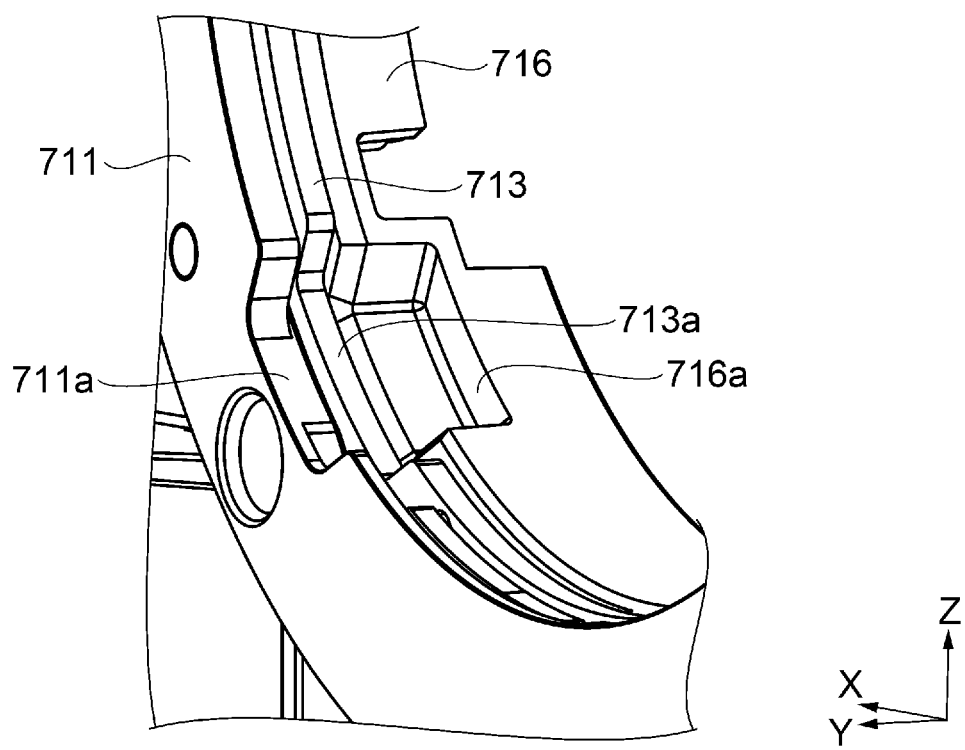
FIG. 7A is an enlarged view showing the state of the first lens holding mechanism that allows the projection lens to be attached thereto and detached therefrom.
Figure 7B:
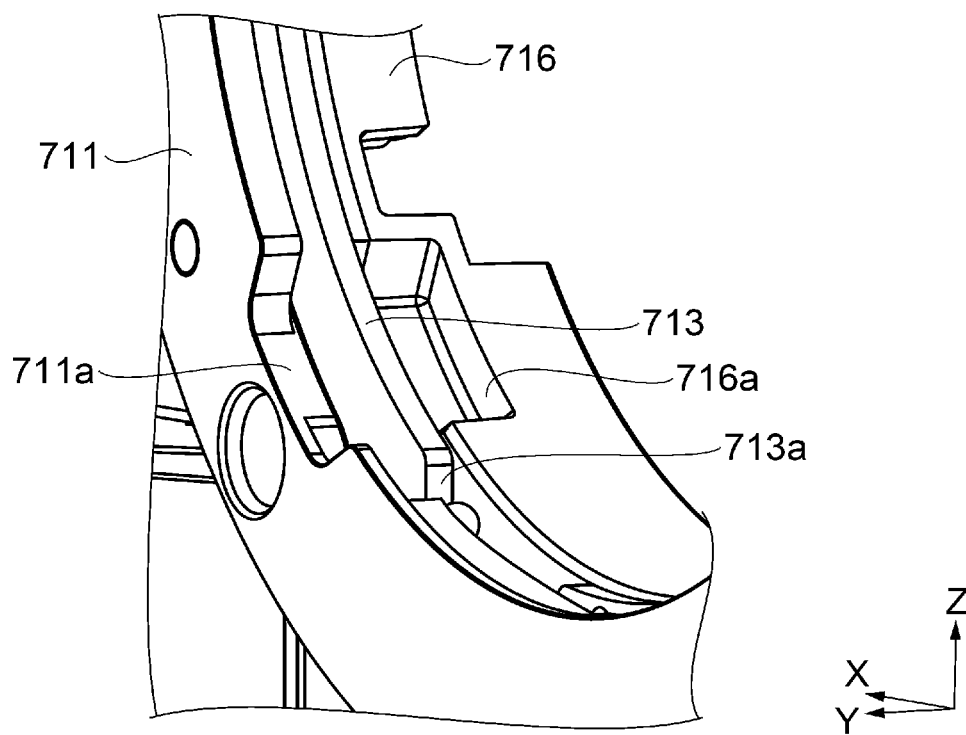
FIG. 7B is an enlarged view showing the state of the first lens holding mechanism that holds the projection lens.

How the first lens holding mechanism 710 holds the projection lens 60 will be described with reference to FIGS. 6, 7A, and 7B. FIG. 6 is a diagrammatic view showing the state in which the first lens holding mechanism is separate from the projection lens. FIG. 7A is an enlarged view showing the state of the first lens holding mechanism that allows the projection lens to be attached thereto and detached therefrom. FIG. 7B is an enlarged view showing the state of the first lens holding mechanism that holds the projection lens. FIG. 6 shows the first lens holding mechanism 710 and part of the projection lens 60, but the other components are omitted. FIGS. 7A and 7B are enlarged views of the area A shown in FIG. 6.

The projection lens 60 includes engagement counterparts 601a, as shown in FIG. 6. The engagement counterparts 601a are provided at the outer circumference of a base portion of the cylindrical section 62. The engagement counterparts 601a are formed of four engagement counterparts disposed in correspondence with the four cutouts 711a of the ring section 711, and the engagement counterparts 601a engage with the cutouts 711a when the projection lens 60 is inserted into the first lens holding mechanism 710. The engagement counterparts 601a are each a projection-shaped portion and are engageable with the cutouts 716a of the base section 715 of the first lens holding mechanism 710.

In the first lens holding mechanism 710, the lever section 714, when it is operated, causes the pivotal section 713 to pivot, so that the positions of the cutouts 13a move. In the state in which the projection lens 60 is attachable to or detachable from the first lens holding mechanism 710, the four cutouts 713a of the pivotal section 713 and the four cutouts 716a of the base section 715 are located in correspondence with the four cutouts 711a of the ring section 711, as shown in FIG. 7A. That is, the positions of the four cutouts 711a, cutouts 713a, and cutouts 716a coincide with one another when viewed from the positive side of the direction Y. Therefore, in the state of the first lens holding mechanism 710 described above, when the cylindrical section 62 is inserted to mount the projection lens 60, the engagement counterparts 601a pass through the cutouts 711a and 713a and engage with the cutouts 716a.

Since the ring section 711 is fixed to the base section 715, the cutouts 716a are always located in correspondence with the cutouts 711a. That is, to mount the projection lens 60, when the lever section 714 of the pivotal section 713 is operated, the pivotal section 713 pivots, so that the cutouts 713a move to the positions corresponding to the cutouts 711a and 716a. To separate the projection lens 60 from the first lens holding mechanism 710, the cutouts 713a are similarly moved to the positions corresponding to the cutouts 711a and 716a. The engagement counterparts 601a therefore pass through the cutouts 711a and 713a, whereby the projection lens 60 can be pulled out toward the positive side of the direction Y.

In the first lens holding mechanism 710, when the lever section 714 is operated, the pivotal section 713 pivots to move the positions of the cutouts 713a from the state described above, as shown in FIG. 7B. At this point, the positions of the cutouts 713a are shifted from the positions of the cutouts 711a and 716a when viewed from the positive side of the direction Y. In other words, the pivotal section 713 excluding the cutouts 713a overlaps with the cutouts 711a and 716a.

When the projection lens 60 is inserted into the first lens holding mechanism 710 in the state shown in FIG. 7A, the cutouts 716a engage with the engagement counterparts 601a. Thereafter, when the lever section 714 is so operated that the state shown in FIG. 7B is achieved, the pivotal section 713 having pivoted engages with the engagement counterparts 601a. The movement of the projection lens 60 relative to the first lens holding mechanism 710 is therefore restricted, and the projection lens 60 is held by the first lens holding mechanism 710. Further, the lever section 714 is operated in the opposite direction to cause the state shown in FIG. 7B to transition to the state shown in FIG. 7A, whereby the projection lens 60 can be separated from the first lens holding mechanism 710.

1.4. How Second Lens Holding Mechanism Holds Projection Lens

Figure 8A:
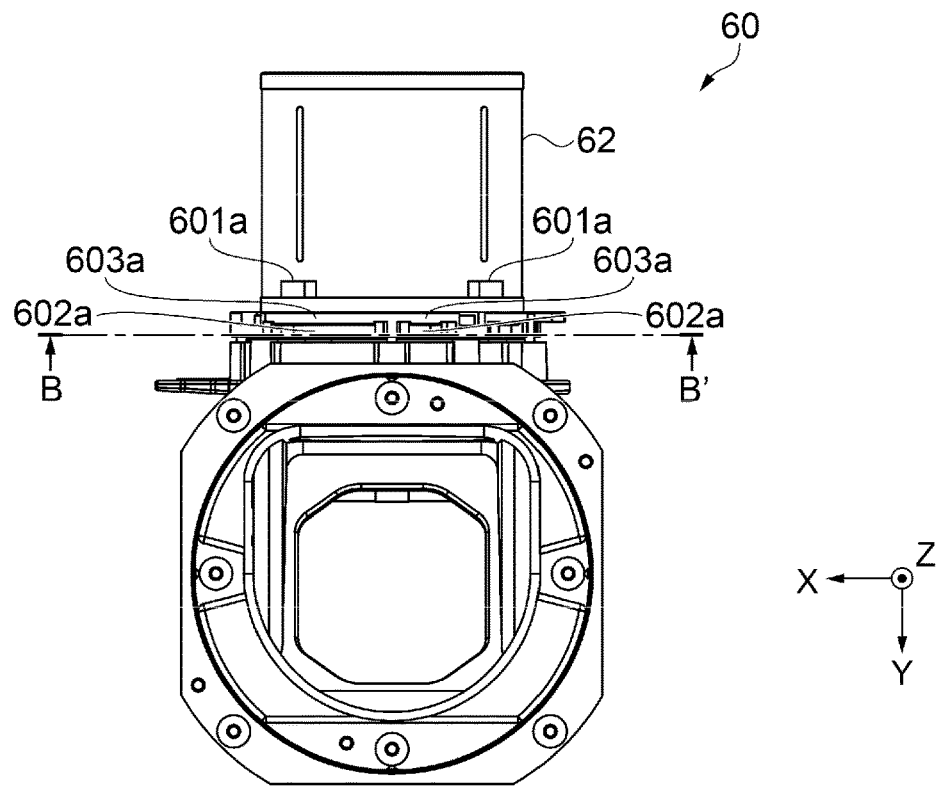
FIG. 8A shows the exterior appearance of a base portion of a cylindrical section of the projection lens viewed from above.
Figure 8B:
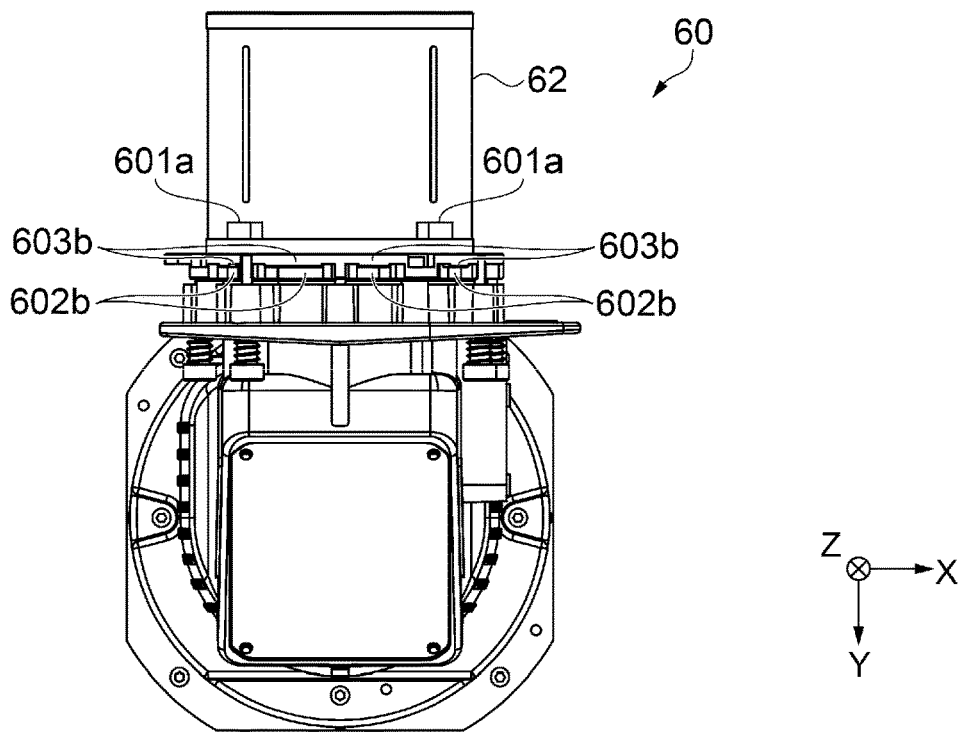
FIG. 8B shows the exterior appearance of the base portion of the cylindrical section of the projection lens viewed from below.
Figure 9A:
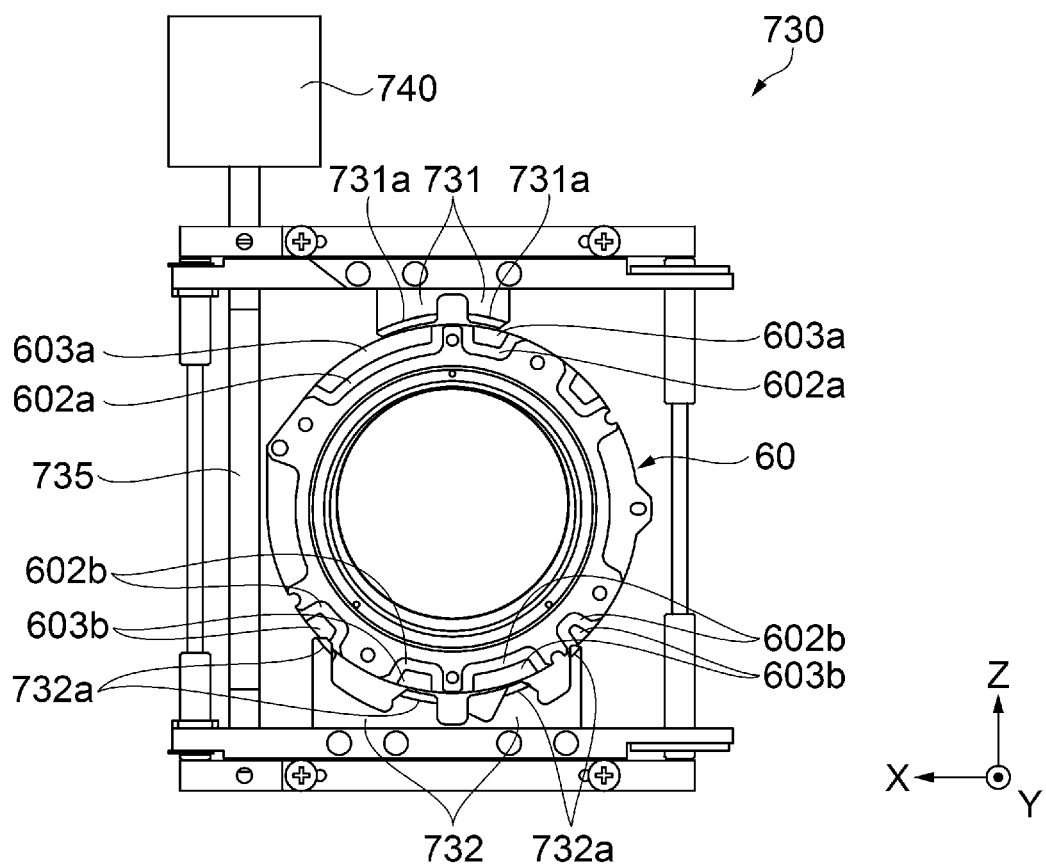
FIG. 9A is a cross-sectional view showing the state of a second lens holding mechanism that allows the projection lens to be attached thereto and detached therefrom.
Figure 9B:
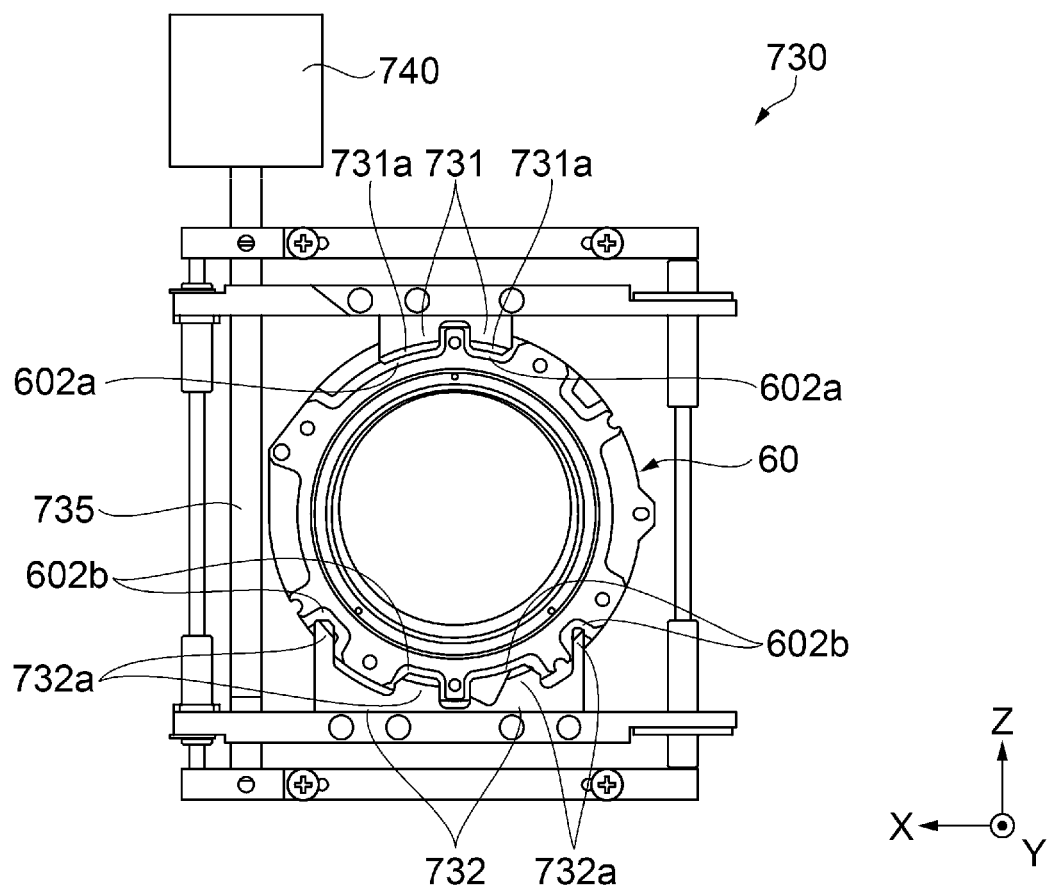
FIG. 9B is a cross-sectional view showing the state of the second lens holding mechanism that holds the projection lens.

How the second lens holding mechanism 730 holds the projection lens 60 will be described with reference to FIGS. 8A, 8B, 9A, and 9B. FIG. 8A shows the exterior appearance of the base portion of the cylindrical section in the projection lens viewed from above. FIG. 8B shows the exterior appearance of the base portion of the cylindrical section in the projection lens viewed from below. FIG. 9A is a cross-sectional view showing the state of the second lens holding mechanism that allows the projection lens to be attached thereto and detached therefrom. FIG. 9B is a cross-sectional view showing the state of the second lens holding mechanism that holds the projection lens. In FIGS. 8A and 8B, part of the projection lens 60 is omitted. FIGS. 9A and 9B show the cross section of the projection lens 60 taken along the plane XZ containing the line B-B□ shown in FIG. 8A and the second lens holding mechanism 730.

The projection lens 60 includes a plurality of recesses 602a and 602b, as shown in FIGS. 8A and 8B. In detail, the recesses 602a are provided in an upper portion of the base portion of the cylindrical section 62 of the projection lens 60, and the recesses 602b are provided in a lower portion of the base portion. The recesses 602*a* and 602*b* are each recessed toward the center axis of the cylindrical section 62. The recesses 602*a* and 602*b* are shifted from the engagement counterparts 601*a* toward the positive side of the direction Y. In the present embodiment, the number of recesses 602*a* is two, and the number of recesses 602*b* is four. The recesses 602*a* are located in correspondence with the protrusions 731*a* of the second lens holding mechanism 730 and engage with the protrusions 731*a*. The recesses 602*b* are located in correspondence with the protrusions 732*a* of the second lens holding mechanism 730 and engage with the protrusions 732*a*.

Wall sections 603*a* are provided on one side of the plurality of recesses 602*a* that is the side facing the negative side of the direction Y. Wall sections 603*b* are provided on one side of the plurality of recesses 602*b* that is the side facing the negative side of the direction Y.

In the state in which the projection lens 60 is attachable to or detachable from the second lens holding mechanism 730, a large distance in the direction Z between the protrusions 731*a* and the protrusions 732*a* is provided, as shown in FIG. 9A. In detail, the distance in the direction Z between the protrusions 731*a* and the protrusions 732*a* is so provided as to be greater than the distance between the recesses 602*a* and the recesses 602*b*. Therefore, when the projection lens 60 is mounted, the cylindrical section 62 is inserted with no interference of the recesses 602*a* and 602*b* and the wall sections 603*a* and 603*b* with the protrusions 731*a* and 732*a*. At this point, the wall sections 603*a* and 603*b* are shifted from the protrusions 731*a* and 732*a* toward the negative side of the direction Y, and the recesses 602*a* and 602*b* overlap with the protrusions 731*a* and 732*a* when viewed along the direction Z.

In the second lens holding mechanism 730, when the dial 740 is caused to pivot, the gap between the holding section 731 and the holding section 732 is changed, as shown in FIG. 9B. That is, when the dial 740 is operated, the distance in the direction Z between the protrusions 731*a* and the protrusions 732*a* is changed. Therefore, when the dial 740 is so caused to pivot that the distance in the direction Z between the protrusions 731*a* and the protrusions 732*a* decreases, the protrusions 731*a* engage with the recesses 602*a*, and the protrusions 732*a* engage with the recesses 602*b*. At the same time, the wall sections 603*a* and 603*b* interfere with the front ends of the protrusions 731*a* and 732*a*. The movement of the projection lens 60 relative to the second lens holding mechanism 730 is thus restricted, whereby the projection lens 60 is held by the second lens holding mechanism 730.

Therefore, to cause the second lens holding mechanism 730 to hold the projection lens 60, the projection lens 60 is inserted into the second lens holding mechanism 730 in the state shown in FIG. 9A. The dial 740 is then caused to pivot clockwise when viewed from above to achieve the state shown in FIG. 9B. On the other hand, to separate the projection lens 60 from the second lens holding mechanism 730, the dial 740 is caused to pivot counterclockwise when viewed from above from the state shown in FIG. 9B to achieve the state shown in FIG. 9A. The projection lens 60 is then pulled out of the second lens holding mechanism 730 toward the positive side of the direction Y to separate the projection lens 60 from the second lens holding mechanism 730.

In the present embodiment, the configuration in which two recesses 602*a* and four recesses 602*b* are provided has been presented by way of example, but the number of recesses 602*a* and 602*b* and the number of protrusions 731*a* and 732*a* corresponding thereto are not limited to specific numbers. Further, the shapes of the recesses 602*a* and 602*b* and the protrusions 731*a* and 732*b* are not limited to those presented by way of example. Moreover, in the present embodiment, the holding section 731 and the holding section 732 sandwich the projection lens 60 from above and below, but the configuration described above is not necessarily employed. The projection lens 60 may instead be sandwiched from right and left.

As described above, the projector 1 as the projection-type display apparatus according to the present embodiment can provide the following effects.

Even when the weight of the projection lens 60 increases, the lens holder 70 can handle the increased load. In detail, the lens holder 70 includes the first lens holding mechanism 710 and the second lens holding mechanism 730 as two different holding mechanisms. Therefore, even when a large-weight projection lens 60 is mounted on the projector 1, the load caused by the projection lens 60 is distributed to the first lens holding mechanism 710 and the second lens holding mechanism 730. That is, a projector 1 including a holding mechanism that reduces the load on the lens holder 70 can be provided.

Since the projection lens 60 is attachable to and detachable from the lens holder 70, a plurality of kinds of projection lens 60 can be used separately in accordance with the application of the projector 1.

In detachment of the projection lens 60 from the projector 1, the projector 1 prevents the projection lens 60 from falling off the projector 1. In detail, the projection lens 60 is held by the lens holder 70 formed of two independent holding mechanisms. Therefore, even when one of the first lens holding mechanism 710 and the second lens holding mechanism 730 releases the projection lens 60, the other keeps holding the projection lens 60. The projector 1 therefore prevents the projection lens 60 from falling off the projector 1 due to wrong operation or carelessness in the detachment operation.

In the first lens holding mechanism 710, the pivotal section 713 pivots and engages with the engagement counterparts 601*a* of the projection lens 60. For example, a bayonet-based lens holding mechanism is required to cause the projection lens 60 itself to pivot, whereas the first lens holding mechanism 710 can hold the projection lens 60 with no pivotal movement of the projection lens 60. A large-weight projection lens 60 can therefore be readily mounted on the projector 1. Further, the attachment and detachment of the projection lens 60 can be readily performed as compared with a configuration in which the projection lens 60 is fixed to the lens holder 70, for example, with screws.

In the second lens holding mechanism 730, pivotal movement of the dial 740 causes the holding sections 731 and 732 to sandwich the projection lens 60, whereby the projection lens 60 is held by the lens holder 70. For example, a bayonet-based lens holding mechanism is required to cause the projection lens 60 itself to pivot, whereas the second lens holding mechanism 730 can hold the projection lens 60 with no pivotal movement of the projection lens 60. Similarly, the projection lens 60 can be detached from the lens holder 70 by causing the dial 740 to pivot to release the projection lens 60 sandwiched between the holding sections 731 and 732. A large-weight projection lens 60 can therefore be readily attached to and detached from the projector 1. Further, the attachment and detachment of the projection lens 60 can be readily performed as compared with a configuration in which the projection lens 60 is fixed to the lens holder 70, for example, with screws.

The plurality of protrusions 731a of the holding section 731 fit into the plurality of recesses 602a of the projection lens 60, and the plurality of protrusions 732a of the holding section 732 fit into the plurality of recesses 602b of the projection lens 60. The projection lens 60 is thus sandwiched between the holding sections 731 and 732. The second lens holding mechanism 730 can therefore hold the projection lens 60 more reliably than in a case where the holding sections 731 and 732 each have one protrusion 731a and one protrusion 732a, respectively, and the projection lens 60 has one recess 602a and one recess 602b.

Second Embodiment

The present embodiment will be described with reference to the case where the projection-type display apparatus is a projector including three liquid crystal panels as the light modulators. The projector according to the present embodiment differs from the projector 1 according to the first embodiment in terms of the configuration of the projection lens, and the main body 2 in the present embodiment has the same configuration of the main body 2 in the first embodiment. Therefore, the same constituent portion as that in the first embodiment has the same reference character, and no redundant description thereof will be made.

2.1. Projection Lens

Figure 10:
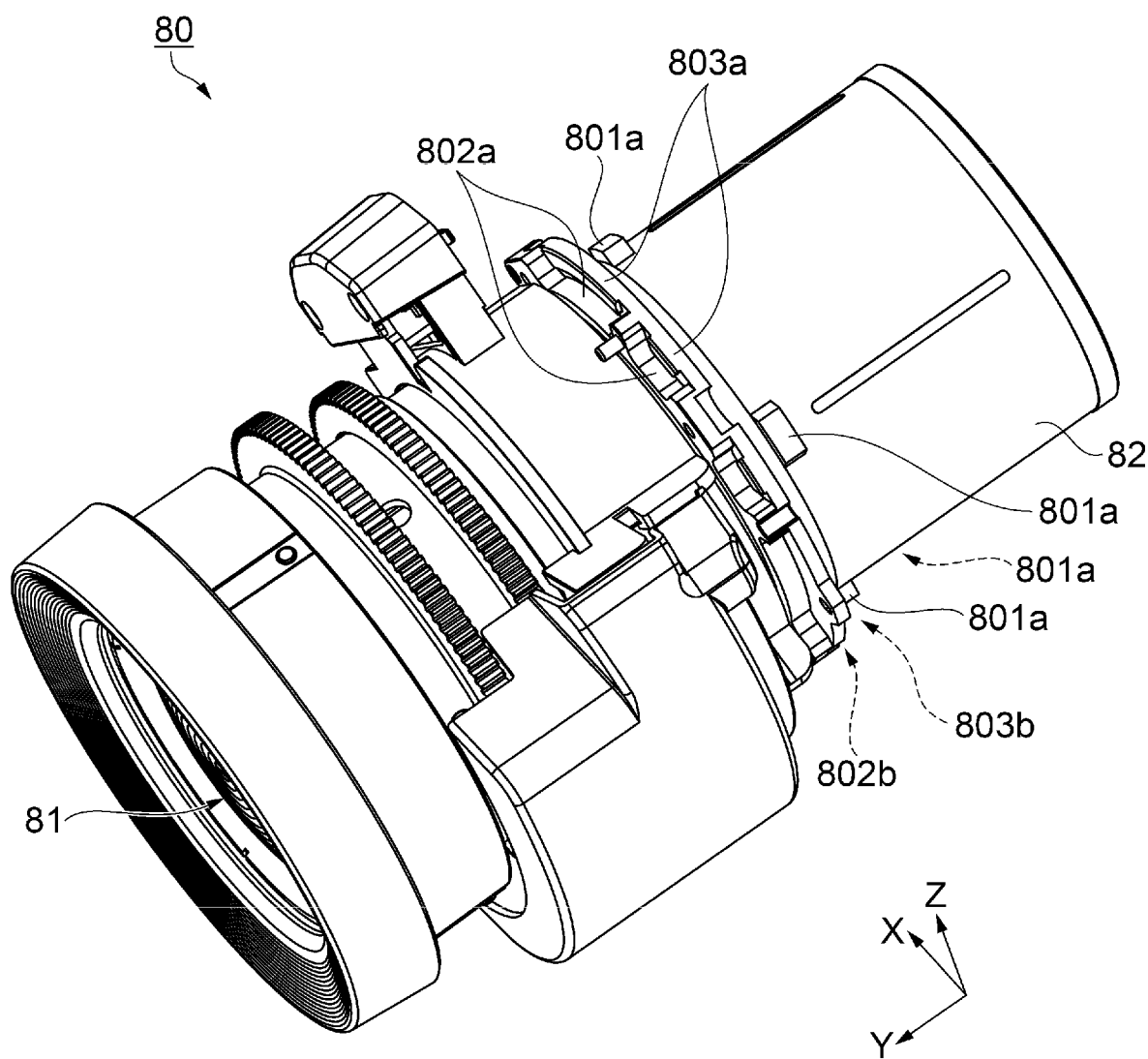
FIG. 10 is a perspective view showing the exterior appearance of a projection lens according to a second embodiment.

The configuration of the projection lens according to the present embodiment will be described with reference to FIG. 10. FIG. 10 is a perspective view showing the exterior appearance of the projection lens according to the second embodiment. FIGS. 1, 4A, and 5 used in the first embodiment will also be referred to for ease of description.

A projection lens 80 according to the present embodiment is a straight-type projection lens and includes an optical system extending in the direction Y, as shown in FIG. 10. A cylindrical section 82 is provided at an end of the above-mentioned optical system of the projection lens 80 that is the end facing the negative side of the direction Y. A lens 81 is disposed at an end of the optical system described above that is the end facing the positive side of the direction Y.

A base portion of the cylindrical section 82 of the projection lens 80 has the same shape as that of the base portion of the cylindrical section 62 of the projection lens 60, which is shown in FIG. 4A, in the first embodiment. The projection lens 80 can therefore be held by the first lens holding mechanism 710 and the second lens holding mechanism 730 shown in FIG. 5. In other words, the projection lens 80 is mountable on the main body 2 shown in FIG. 1.

When the projection lens 80 is mounted on the main body 2, the cylindrical section 82 is inserted into the main body 2, and the projection lens 80 is held by the lens holder 70. In the state in which the projection lens 80 is mounted on the main body 2, the combined light having exited out of the cross dichroic prism 50 in the main body 2 toward the positive side of the direction Y is incident on an end surface of the cylindrical section 82 that is the end surface on the negative side of the direction Y. The combined light travels via the optical system of the projection lens 80 and is projected as the image light via the lens 81 toward the positive side of the direction Y. That is, the projection lens 80 projects the light modulated by the liquid crystal panels 40R, 40G, and 40B shown in FIG. 1 in the main body 2.

The projection lens 80 includes engagement counterparts 801a, which engage with the pivotal section 713 when the pivotal section 713 in the first lens holding mechanism 710 pivots. The engagement counterparts 801a are provided at the outer circumference of a base portion of the cylindrical section 82. The engagement counterparts 801a are formed of four engagement counterparts so disposed in correspondence with the four cutouts 711a of the ring section 711 of the first lens holding mechanism 710 into which the projection lens 80 is inserted. The engagement counterparts 801a are each a projection-shaped portion and are engageable with the cutouts 716a of the base section 715 of the first lens holding mechanism 710.

To cause the first lens holding mechanism 710 to hold the projection lens 80, the lever section 714 is operated to cause the cutouts 711a, 713a, and 716a to coincide with one another when viewed in the direction Y. The projection lens 80 is then inserted into the first lens holding mechanism 710. In this process, the engagement counterparts 801a pass through the cutouts 711a and 713a and engage with the cutouts 716a. Thereafter, when the lever section 714 is operated, the pivotal section 713 pivots, so that the pivotal section 713 engages with the engagement counterparts 801a. The movement of the projection lens 80 relative to the first lens holding mechanism 710 is thus restricted, whereby the projection lens 80 is held by the first lens holding mechanism 710. Operating the lever section 714 in the opposite direction releases the engagement between the pivotal section 713 and the engagement counterpart 801a, whereby the projection lens 80 can be separate from the first lens holding mechanism 710.

The projection lens 80 has a plurality of recesses 802a located in correspondence with the plurality of protrusions 731a in the second lens holding mechanism 730 shown in FIG. 5. The plurality of protrusions 731a fit into the plurality of recesses 802a, respectively. The projection lens 80 further has a plurality of recesses 802b located in correspondence with the plurality of protrusions 732a in the second lens holding mechanism 730. The plurality of protrusions 732a fit into the plurality of recesses 802b, respectively.

To cause the second lens holding mechanism 730 to hold the projection lens 80, the dial 740 is operated to widen the gap between the holding section 731 and the holding section 732. In this state, the projection lens 80 is inserted into the second lens holding mechanism 730. The dial 740 is then caused to pivot clockwise when viewed from above to narrow the gap between the holding section 731 and the holding section 732, so that the protrusions 731a engage with the recesses 802a and the protrusions 732a engage with the recesses 802b. At the same time, wall sections 803a and 803b interfere with the front ends of the protrusions 731a and 732a. The movement of the projection lens 80 relative to the second lens holding mechanism 730 is thus restricted, whereby the projection lens 80 is held by the second lens holding mechanism 730.

On the other hand, to separate the projection lens 80 from the second lens holding mechanism 730, the dial 740 is caused to pivot counterclockwise when viewed from above to widen the gap between the holding section 731 and the holding section 732. The projection lens 80 is then pulled out of the second lens holding mechanism 730 toward the positive side of the direction Y to separate the projection lens 80 from the second lens holding mechanism 730.

As described above, the projector as the projection-type display apparatus according to the present embodiment can provide the same effects as those provided by the first embodiment.

Third Embodiment

The present embodiment will be described with reference to the case where the projection-type display apparatus is a projector including three liquid crystal panels as the light modulators. In the projector according to the present embodiment, the position adjustment mechanism (lens shift mechanism) that adjusts the position of the projection lens 60 is added to the main body 2 of the projector 1 according to the first embodiment. Therefore, the same constituent portion as that in the first embodiment has the same reference character, and no redundant description thereof will be made. The projection lens 80 according to the embodiment described above is also mountable on the main body in the present embodiment.

3.1. Lens Shift Mechanism

Figure 11:
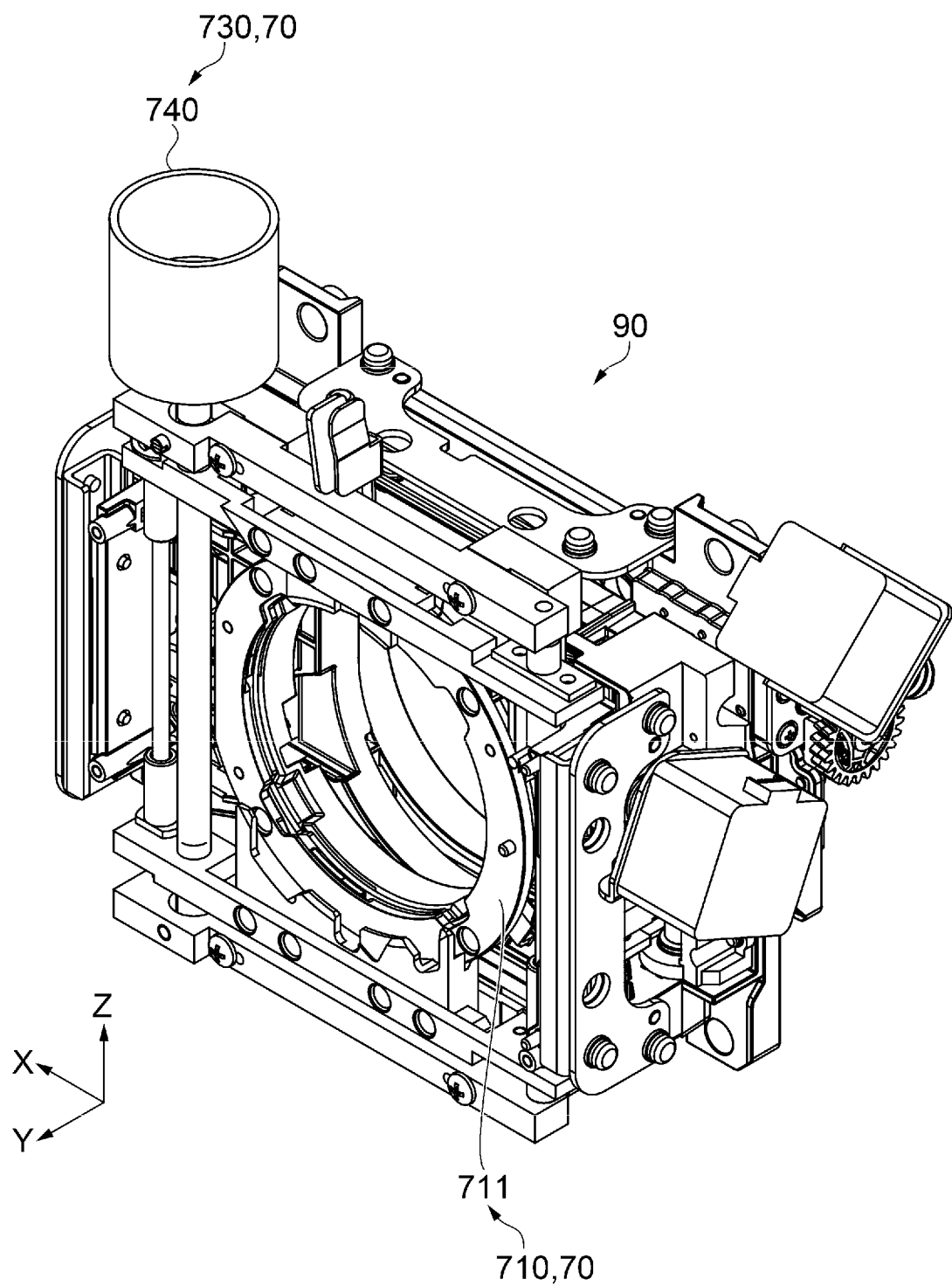
FIG. 11 is a perspective view showing the exterior appearance of a lens shift mechanism according to a third embodiment.
Figure 12:
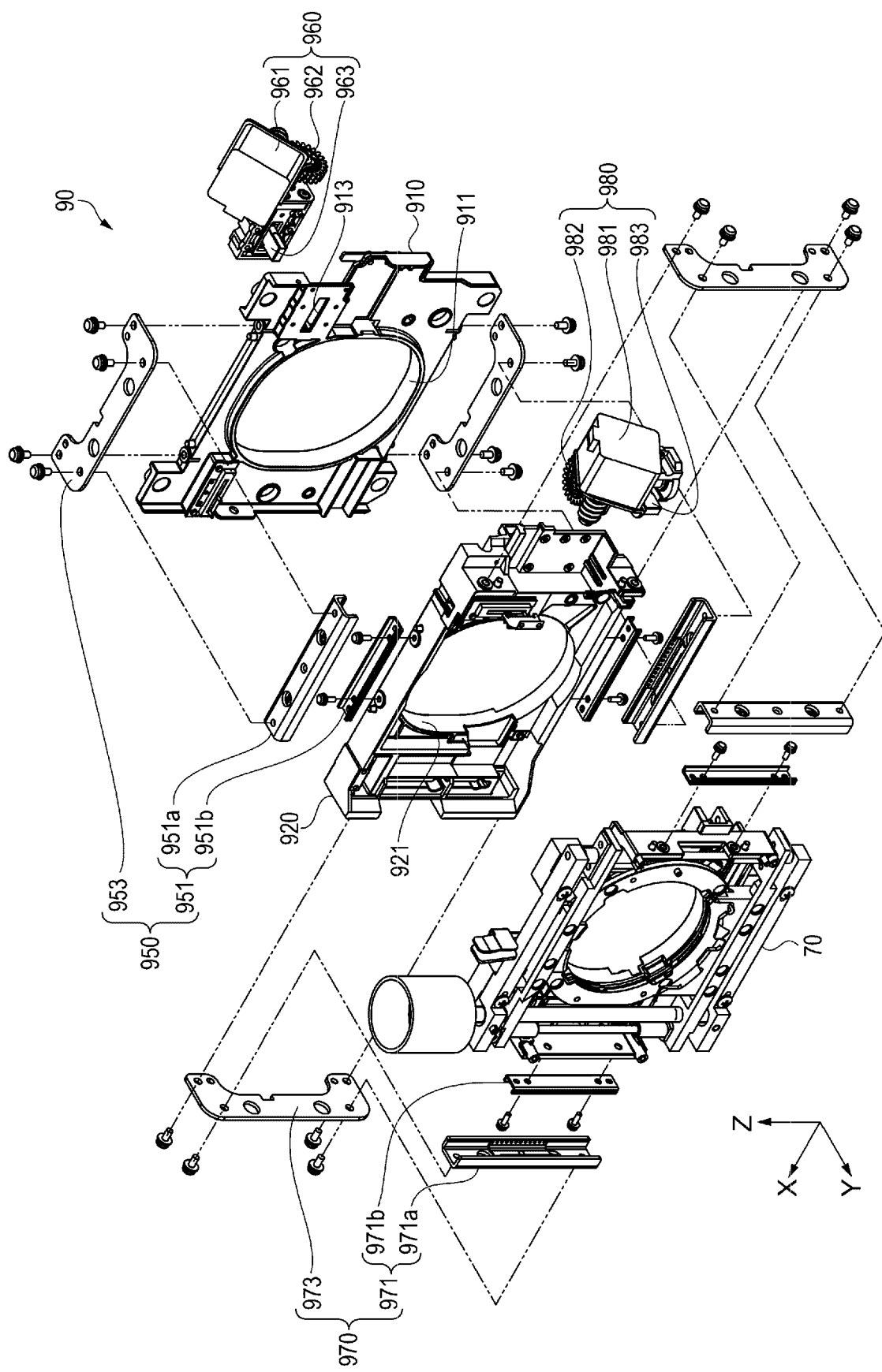
FIG. 12 is an exploded view showing the configuration of the lens shift mechanism.

The configuration of the lens shift mechanism according to the present embodiment will be described with reference to FIGS. 11 and 12. FIG. 11 is a perspective view showing the exterior appearance of the lens shift mechanism according to the third embodiment. FIG. 12 is an exploded view showing the configuration of the lens shift mechanism. FIGS. 11 and 12 show also the first lens holding mechanism 710 and the second lens holding mechanism 730. In FIG. 12, only one of first and second movement mechanisms, which are paired with each other, is labeled with a reference character, and the other is not.

The main body in the present embodiment includes a lens shift mechanism 90 as the position adjustment mechanism that moves the position of the lens holder 70 relative to the liquid crystal panels 40R, 40G, and 40B shown in FIG. 1.

The lens shift mechanism 90 supports the lens holder 70, as shown in FIG. 11. The lens shift mechanism 90 relatively moves the lens holder 70 in a direction perpendicular to the direction Y. The position of the projection lens 60 shown in FIG. 1 and held by the lens holder 70 can thus be adjusted.

The lens shift mechanism 90 includes a substrate 910 and a moving section 920, as shown in FIG. 12. The substrate 910, the moving section 920, and the lens holder 70 are disposed in the presented order in the direction toward the positive side of the direction Y. In other words, the substrate 910 is located closer to the cross dichroic prism 50 shown in FIG. 1 than the other two components.

The substrate 910 is a substantially oblong, plate-shaped member extending along the plane XZ, and an opening 911 is provided at the center of the substrate 910. Although not shown, the substrate 910 is fixed to a structural body in the main body. When the substrate 910 is viewed in the direction Y, the pair of long edges of the substrate 910 extend along the direction X, and the pair of short edges of the substrate 910 extend along the direction Z. The opening 911 serves as a clearance of the cylindrical section 62 when the projection lens 60 is mounted. To this end, the opening 911 has a cross section in the plane XZ larger than that of the cylindrical section 62.

The moving section 920 is a substantially oblong, plate-shaped member extending along the plane XZ, and an opening 921 is provided at the center of the moving section 920. When the moving section 920 is viewed in the direction Y, the pair of long edges of the moving section 920 extend along the direction X, and the pair of short edges of the moving section 920 extend along the direction Z. The opening 921 serves as a clearance of the cylindrical section 62 when the projection lens 60 is mounted. To this end, the opening 921 has a cross section in the plane XZ larger than that of the cylindrical section 62.

The substrate 910 and the moving section 920 are linked to each other via a pair of first movement mechanisms 950. In detail, the pair of long edges of each of the substrate 910 and the moving section 920 are provided with the first movement mechanisms 950. The first movement mecha-nisms 950 each includes a slider 951 and an attachment plate 953. The slider 951 and the attachment plate 953 are each a substantially oblong member elongated in the direction X. The slider 951 includes a fixed section 951a and a movable section 951b. The movable section 951b is in contact with a rail that is not shown but is part of the fixed section 951a and is supported by the fixed section 951a. The movable section 951b is therefore movable in the direction X relative to the fixed section 951a with the movable section 951b guided by the rail of the fixed section 951a.

Out of the components that form the first movement mechanism 950, the attachment plate 953 and the fixed section 951a of the slider 951 are fixed to the substrate 910 with screws. That is, since the substrate 910 is fixed to a structural body in the main body, the position of the substrate 910 relative to the liquid crystal panels 40R, 40G, and 40B, which are also fixed to the main body is therefore fixed. In contrast, the movable section 951b, out of the components that form the first movement mechanism 950, is fixed to the moving section 920 with screws. The substrate 910 and the moving section 920 are therefore movable relative to each other in the direction X via the first movement mechanism 950.

A first driver 960 is fixed to the substrate 910 in a position above the left short edge of the substrate 910 when viewed from the negative side of the direction Y. The first driver 960 includes an electric motor 961, which is capable of reverse rotation, a drive shaft that is not shown but is part of the electric motor 961, a plurality of gears 962, and a projection 963. The rotation of the electric motor 961 is transmitted to the projection 963 from the drive shaft via the plurality of gears 962 and other components. The projection 963 is movable relative to the first driver 960 in the direction X based on the driving force produced by the electric motor 961.

The projection 963 protrudes toward the positive side of the direction Y. Therefore, a portion of the substrate 910 that is the portion to which the first driver 960 is fixed is provided with a slit 913, into which the projection 963 of the first driver 960 is inserted. The slit 913 is elongated in the direction X and allows the projection 963 of the first driver 960 to remain inserted but does not restrict movement of the projection 963 in the direction X. Although not shown, the front end of the projection 963 is fixed to a corresponding position of the moving section 920. The driving force produced by the first driver 960 therefore allows the moving section 920 to move in the direction X relative to the substrate 910. The first driver 960 is electrically connected to a controller that is not shown but is part of the main body.

The moving section 920 and the lens holder 70 are linked to each other via a pair of second movement mechanisms 970. In detail, the pair of short edges of each of the moving section 920 and the lens holder 70 are provided with the second movement mechanisms 970. The second movement mechanisms 970 each includes a slider 971 and an attachment plate 973. The slider 971 and the attachment plate 973 are each a substantially oblong member elongated in the direction Z. The slider 971 includes a fixed section 971a and a movable section 971b. The movable section 971b is in contact with a rail that is not shown but is part of the fixed section 971a and is supported by the fixed section 971a. The movable section 971b is therefore movable in the direction Z relative to the fixed section 971a with the movable section 971b guided by the rail of the fixed section 971a.

Out of the components that form the second movement mechanism 970, the attachment plate 973 and the fixed section 971a of the slider 971 are fixed to the moving section 920 with screws. In contrast, the movable section 971b, out of the components that form the second movement mechanism 970, is fixed to the lens holder 70 with screws. The moving section 920 and the lens holder 70 are therefore movable relative to each other in the direction Z via the second movement mechanism 970.

A second driver 980 is fixed to the moving section 920 substantially at the center of the left short edge of the moving section 920 in the direction Z when viewed from the negative side of the direction Y. The second driver 980 includes an electric motor 981, which is capable of reverse rotation, a drive shaft that is not shown but is part of the electric motor 981, a plurality of gears 982, and a projection 983. The rotation of the electric motor 981 is transmitted to the projection 983 from the drive shaft via the plurality of gears 982 and other components. The projection 983 is movable relative to the second driver 980 in the direction Z based on the driving force produced by the electric motor 981.

The projection 983 protrudes toward the positive side of the direction Y. Although not shown, the front end of the projection 983 is fixed to a corresponding position of the lens holder 70. The driving force produced by the second driver 980 therefore allows the lens holder 70 to move in the direction Z relative to the moving section 920. The second driver 980 is electrically connected to the controller, which is not shown but is part of the main body.

The thus configured lens shift mechanism 90 can move the projection lens 60 held by the lens holder 70 in the directions perpendicular to the direction Y relative to the liquid crystal panels 40R, 40G, and 40B. Although not shown, an electric signal that operates the lens shift mechanism 90 is inputted to the controller from an operation panel provided on the main body or an information instrument, such as a personal computer. The lens shift mechanism 90 is then operated via the controller.

In the present embodiment, the configuration in which the lens holder 70 is relatively moved in the directions perpendicular to the direction Y has been presented as an example of the lens shift mechanism 90, but not necessarily. The lens shift mechanism 90 may instead be configured to relatively move the lens holder 70 only in one direction perpendicular to the direction Y. Further, in the lens shift mechanism 90, the first movement mechanism 950 and the second movement mechanism 970 are electrically driven, but not necessarily. The first movement mechanism 950 and the second movement mechanism 970 may instead be manually driven.

As described above, the projector as the projection-type display apparatus according to the present embodiment can provide the following effects in addition to the effects in the first embodiment.

The projector allows what is called lens shifting for adjusting the position of the projection lens 60 or the projection lens 80 relative to the liquid crystal panels 40R, 40G, and 40B. The lens shifting described above allows adjustment of the position where the projector projects an image or the like and prevents the projection range from having a trapezoidal shape with no change in the position of the projector.

Contents derived from the embodiments are described below.

A projection-type display apparatus includes a main body and a projection lens. The main body includes a light source, a light modulator that modulates light outputted from the light source, and a lens holder to and from which the projection lens is attachable and detachable. The projection lens projects the light modulated by the light modulator. The lens holder includes a first lens holding mechanism that holds the projection lens and a second lens holding mechanism different from the first lens holding mechanism.

According to the configuration described above, even when the weight of the projection lens increases, the lens holder can handle the increased load. In detail, the lens holder includes the first lens holding mechanism and the second lens holding mechanism as two different holding mechanisms. Therefore, even when a large-weight projection lens is mounted on the projection-type display apparatus, the load caused by the projection lens is distributed to the first lens holding mechanism and the second lens holding mechanism. That is, a projection-type display apparatus including a holding mechanism that reduces the load on the lens holder can be provided.

In the projection-type display apparatus described above, it is preferable that the second lens holding mechanism holds the projection lens independently of the first lens holding mechanism.

According to the configuration described above, in detachment of the projection lens from the projection-type display apparatus, the projection-type display apparatus prevents the projection lens from falling off the projection-type display apparatus. In detail, the projection lens is held by the lens holder formed of the two independent holding mechanisms. Therefore, even when one of the first lens holding mechanism and the second lens holding mechanism releases the projection lens, the other keeps holding the projection lens. The projection-type display apparatus therefore prevents the projection lens from falling off the projection-type display apparatus due to wrong operation or carelessness in the detachment operation.

In the projection-type display apparatus described above, it is preferable that the second lens holding mechanism includes a holding section capable of sandwiching the projection lens, a support section that supports the holding section, and a switching section that moves the support section to switch a state in which the holding section sandwiches the projection lens and a state in which the projection lens sandwiched by the holding section is released from one to the other.

According to the configuration described above, in the second lens holding mechanism, operating the switching section causes the holding section to sandwich the projection lens, whereby the projection lens is held by the lens holder. For example, a bayonet-based lens holding mechanism is required to cause the projection lens itself to pivot, whereas the second lens holding mechanism can hold the projection lens with no pivotal movement of the projection lens. Similarly, the projection lens can be detached from the lens holder by operating the switching section to release the projection lens sandwiched by the holding section. A large-weight projection lens can therefore be readily attached to and detached from the projection-type display apparatus. Further, the attachment and detachment of the projection lens can be readily performed as compared with a configuration in which the projection lens is fixed to the lens holder, for example, with screws.

In the projection-type display apparatus described above, it is preferable that the switching section is a dial, and that the dial is caused to pivot to move the support section so that the state in which the holding section sandwiches the projection lens and the state in which the sandwiched projection lens is released are switched from one to the other.

According to the configuration described above, the pivotal movement of the dial readily allows the state in which the projection lens is sandwiched and the state in which the sandwiched projection lens is released to be switched from one to the other. The attachment and detachment of the projection lens can therefore be further readily performed.

In the projection-type display apparatus described above, it is preferable that the holding section has a plurality of protrusions, and that the projection lens has a plurality of recesses which are located in correspondence with the plurality of protrusions and into which the plurality of protrusions fit.

According to the configuration described above, the plurality of protrusions of the holding section fit into the plurality of recesses of the projection lens, whereby the projection lens is sandwiched by the holding section. The second lens holding mechanism can therefore hold the projection lens more reliably than in a case where the holding section has one protrusion and the projection lens has one recess.

In the projection-type display apparatus described above, it is preferable that the first lens holding mechanism includes a pivotal section capable of pivoting along the outer circumference of the projection lens and a lever section that causes the pivotal section to pivot, and that the projection lens includes an engagement counterpart that engages with the pivotal section when the pivotal section is caused to pivot.

According to the configuration described above, in the first lens holding mechanism, the pivotal section pivots and engages with the engagement counterpart of the projection lens. For example, a bayonet-based lens holding mechanism is required to cause the projection lens itself to pivot, whereas the first lens holding mechanism can hold the projection lens with no pivotal movement of the projection lens. A large-weight projection lens can therefore be readily mounted on the projection-type display apparatus. Further, the attachment and detachment of the projection lens can be readily performed as compared with a configuration in which the projection lens is fixed to the lens holder, for example, with screws.

It is preferable that the projection-type display apparatus described above includes a position adjustment mechanism that moves the position of the lens holder relative to the light modulator.

According to the configuration described above, the projection-type display apparatus allows what is called lens shifting for adjusting the position of the projection lens relative to the light modulator. The lens shifting described above allows adjustment of the position where the projection-type display apparatus projects an image or the like and prevents the projection range from having a trapezoidal shape with no change in the position of the projection-type display apparatus.

A lens holding mechanism is a lens holding mechanism that holds a projection lens and includes a first lens holding mechanism and a second lens holding mechanism different from the first lens holding mechanism.

According to the configuration described above, even when the weight of the projection lens increases, the lens holding mechanism can handle the increased load. In detail, the lens holding mechanism includes a first lens holding mechanism and a second lens holding mechanism as two different holding mechanisms. Therefore, even when a large-weight projection lens is mounted, a small load acts on each of the first lens holding mechanism and the second lens holding mechanism. That is, a lens holding mechanism on which a reduced load acts can be provided.

What is claimed is:
1. A projection-type display apparatus comprising:
an exterior enclosure:
a main body that is accommodated in the exterior enclosure;
a light source disposed at the main body;
a first light modulator that modulates first light;
a second light modulator that modulates second light;
a third light modulator that modulates third light;
a light combining system that combines the first light, the second light and the third light and exits a combined light in a first direction;
a lens holder disposed at the main body; and
a projection lens having a cylindrical section held by the lens holder and which is provided at one end portion of the projection lens and housing an optical system that reflects the combined light exited from the light combining system and projects the combined light toward above the main body;
wherein the lens holder includes:
a first projection lens holder holding the cylindrical section, and
a second projection lens holder holding the cylindrical section at a different position from a position where the first projection lens holder holds the cylindrical section, and
wherein the projection lens is attachable and detachable from the main body via the first projection lens holder and the second projection lens holder.

2. The projection-type display apparatus according to claim 1, further comprising a lens shift mechanism that moves the first projection lens holder and the second projection lens holder in a direction perpendicular to the first direction relative to the light combining system.

3. The projection-type display apparatus according to claim 1,
wherein the second projection lens holder includes a protrusion, and
the cylindrical section include a recess which are located in correspondence with the protrusion and into which the protrusions fit.

4. The projection-type display apparatus according to claim 1, wherein
the first projection lens holder is released by a relative pivot between the first projection lens holder and the cylindrical section from a state in which the projection lens is held,
the second projection lens holder has an operation section exposed to the outside from the exterior enclosure, and
the second projection lens holder is released by operating the operation section from the state in which the projection lens is held.

5. A projection-type display apparatus comprising:
an exterior enclosure
a main body that is accommodated in the exterior enclosure;
a light source disposed at the main body;
a light modulator that modulates light outputted from the light source;
a lens holder disposed at the main body; and
a projection lens having a cylindrical section held by the lens holder and which is provided at one end portion of the projection lens and the light modulated by the light modulator is incident on a first direction and housing an optical system that reflects the light modulated by the light modulator and projects the light modulated by the light modulator toward above the main body;

wherein the lens holder includes
a first projection lens holder holding the cylindrical section, and
a second projection lens holder holding the cylindrical section at a different position from a position where the first projection lens holder holds the cylindrical section, and
wherein the projection lens is attachable and detachable from the main body via the first projection lens holder and the second projection lens holder.

6. The projection-type display apparatus according to claim 5,
wherein the second projection lens holder includes a protrusion, and
the cylindrical section include a recess which are located in correspondence with the protrusion and into which the protrusions fit.

7. The projection-type display apparatus according to claim 5, wherein
the first projection lens holder is released by a relative pivot between the first projection lens holder and the cylindrical section from a state in which the projection lens is held,
the second projection lens holder has an operation section exposed to the outside from the exterior enclosure, and
the second projection lens holder is released by operating the operation section from the state in which the projection lens is held.

\* \* \* \* \*